US010743968B2

(12) United States Patent
Fisker et al.

(10) Patent No.: US 10,743,968 B2
(45) Date of Patent: Aug. 18, 2020

(54) CREATING A DIGITAL RESTORATION DESIGN

(71) Applicant: 3SHAPE A/S, Copenhagen K (DK)

(72) Inventors: Rune Fisker, Virum (DK); Sven Nonboe, Hillerød (DK)

(73) Assignee: 3SHAPE A/S, Copenhagen K (DK)

( * ) Notice: Subject to any disclaimer, the term of this patent is extended or adjusted under 35 U.S.C. 154(b) by 0 days.

(21) Appl. No.: 15/514,240

(22) PCT Filed: Sep. 24, 2015

(86) PCT No.: PCT/EP2015/071958
§ 371 (c)(1),
(2) Date: Mar. 24, 2017

(87) PCT Pub. No.: WO2016/046308
PCT Pub. Date: Mar. 31, 2016

(65) Prior Publication Data
US 2017/0273763 A1    Sep. 28, 2017

(30) Foreign Application Priority Data
Sep. 24, 2014  (DK) ................... 2014 70592

(51) Int. Cl.
*G06T 17/00*   (2006.01)
*A61C 13/00*   (2006.01)
(Continued)

(52) U.S. Cl.
CPC ............ *A61C 13/0004* (2013.01); *A61C 5/20* (2017.02); *A61C 9/0046* (2013.01)

(58) Field of Classification Search
USPC ........................................................ 345/420
See application file for complete search history.

(56) References Cited

U.S. PATENT DOCUMENTS

2006/0063135 A1*  3/2006  Mehl .................. A61C 13/0004
                                                              433/223
2009/0220916 A1*  9/2009  Fisker .................... A61C 9/00
                                                              433/201.1
(Continued)

FOREIGN PATENT DOCUMENTS

WO    WO 2009/006303 A2    1/2009
WO    WO 2010/074890 A1    7/2010
(Continued)

OTHER PUBLICATIONS

International Search Report (PCT/ISA/210) dated Nov. 16, 2015, by the European Patent Office as the International Searching Authority for International Application No. PCT/EP2015/071958.
(Continued)

*Primary Examiner* — Gordon G Liu
(74) *Attorney, Agent, or Firm* — Buchanan Ingersoll & Rooney PC

(57) ABSTRACT

A method, a system and a user interface for creating a digital restoration design for the manufacture of a dental restoration for one or more of a patient's teeth where minimal manual interaction is required when setting the restoration margin line includes obtaining a digital 3D representation of the patient's unprepared teeth; obtaining a set of one or more digital teeth anatomies; arranging the digital teeth anatomies and the digital 3D representation according to a preferred relative arrangement and creating a digital restoration design including a restoration margin line, where the restoration margin line is derived at least partly from an intersection of the digital 3D representation and the digital teeth anatomies.

23 Claims, 17 Drawing Sheets

(51) Int. Cl.
*A61C 5/20* (2017.01)
*A61C 9/00* (2006.01)

(56) References Cited

U.S. PATENT DOCUMENTS

| | | | |
|---|---|---|---|
| 2010/0099058 A1* | 4/2010 | Wang | A61C 13/0004 433/173 |
| 2010/0145898 A1* | 6/2010 | Malfliet | G06T 7/0012 706/47 |
| 2010/0281370 A1* | 11/2010 | Rohaly | A61C 9/0053 715/719 |
| 2011/0196524 A1* | 8/2011 | Giasson | A61C 13/0004 700/103 |
| 2012/0041740 A1 | 2/2012 | Beeby et al. | |
| 2012/0088208 A1* | 4/2012 | Schulter | A61C 8/0001 433/173 |
| 2013/0218530 A1* | 8/2013 | Deichnnann | A61C 13/0004 703/1 |
| 2013/0282351 A1 | 10/2013 | Tank | |
| 2013/0308843 A1 | 11/2013 | Tank | |
| 2014/0335470 A1* | 11/2014 | Fisker | A61C 9/0053 433/29 |
| 2015/0056576 A1* | 2/2015 | Nikolskiy | A61C 13/0004 433/214 |
| 2015/0348320 A1* | 12/2015 | Pesach | A61C 9/0053 382/128 |
| 2015/0366643 A1* | 12/2015 | Schluter | A61C 13/082 433/218 |

FOREIGN PATENT DOCUMENTS

| | | |
|---|---|---|
| WO | WO 2012/055420 A1 | 5/2012 |
| WO | WO 2013/079437 A2 | 6/2013 |

OTHER PUBLICATIONS

Written Opinion (PCT/ISA/237) dated Nov. 16, 2015, by the European Patent Office as the International Searthing Authority for International Application No. PCT/EP2015/071958.

* cited by examiner

CREATING A DIGITAL RESTORATION DESIGN

TECHNICAL FIELD

This invention generally relates to digital restoration designs for the manufacture of dental restorations. More particularly, the invention relates to digital restoration designs created with minimal user interaction in setting a restoration margin line for the dental restoration.

BACKGROUND

A patient may for various reasons desire that the size of the teeth is increased or the shape and/or color of the teeth is changed. This can be the case when the length of the teeth has been reduced due to e.g. grinding the teeth in sleep (Sleep Bruxism), or when the patient wishes to improve the aesthetic appearance of his teeth.

When a patient has worn his teeth down to an extent where it causes the patients occlusion to be disrupted, the result may be that the patient begins to experience problems in his temporomandibular joint (TMJ). Such problems may be solved by raising the bite such that a correct height of his occlusal table and hence a correct movement of the TMJ is restored. The bite can be raised using a set of table-top teeth arranged at the occlusal surface or incisal edge of the patient's teeth to replace the defective occlusal table of the patient's worn teeth. The phrase "raising the occlusal surface/incisal edge of a tooth" refers to the situation where the occlusal surface/incisal edge of the tooth is moved further away from the cervical/apical part of the tooth. I.e. when the patient's bite is raised the distance between the mandibular and maxillary jaw bones in occlusion is increased.

The table-top restoration preferably has a plurality of teeth covering at least the occlusal table of the worn teeth but the table-top restoration does not necessarily cover the entire labial/buccal and lingual surfaces of the patient's teeth.

The table-top teeth restoration does not necessarily require that the patient's teeth are prepared in order to allow the table-top restoration to be seated at the teeth. Especially for a temporary table-top restoration it may be advantageous to avoid extensive preparation of the patient's teeth until the bite has been raised, i.e. until the patient has become used to the corrected bite movement.

In prior art CAD software for designing dental restorations, the user must manually set the restoration margin line. The restoration margin line can be set using e.g. a computer mouse to mark relevant points on a digital 3D representation of the patient's teeth visualized on e.g. a computer screen.

Digital design of dental restorations, such as dental crowns or bridges, is often based on a digital 3D representation of the patient's teeth obtained after the teeth has been prepared for accepting the dental restoration. The preparation often occur by the dentist grinding away tooth material to realize a tooth stump, as so-called preparation, onto which the dental restoration can be seated. A restoration margin line is set e.g. from the tooth preparation line of the prepared tooth in the digital 3D representation. The operator then creates the digital restoration design from the restoration margin line e.g. by modifying a library tooth to have the set restoration margin line.

It remains a problem to provide a method, a user interface, and a system for creating digital restoration designs where the operator does not need to set the restoration margin line manually.

SUMMARY

Disclosed is a method for creating a digital restoration design for the manufacture of a dental restoration for one or more of a patient's teeth where minimal manual interaction is required when setting the restoration margin line, wherein the method comprises:
- obtaining a digital 3D representation of the patients unprepared teeth;
- obtaining a set of one or more digital teeth anatomies;
- arranging the digital teeth anatomies and the digital 3D representation according to a preferred relative arrangement; and
- creating a digital restoration design comprising a restoration margin line, where the restoration margin line is derived at least partly from an intersection of the digital 3D representation and the digital teeth anatomies.

Disclosed is a method for creating a digital restoration design for one or more of a patient's teeth without manually setting the restoration margin line of the dental restoration, where the method comprises:
- obtaining a digital 3D representation of the unprepared patient's teeth;
- obtaining a set of one or more digital teeth anatomies;
- arranging the digital teeth anatomies and the digital 3D representation according to a preferred relative arrangement; and
- creating a digital restoration design comprising a restoration margin line, where the restoration margin line is derived from an intersection of the digital 3D representation and the digital teeth anatomies.

Disclosed is a method for creating a digital restoration design for the manufacture of a dental restoration for one or more of a patient's teeth where minimal manual interaction is required when setting the restoration margin line, where the method comprises:
- obtaining a digital 3D representation of the patient's unprepared teeth;
- obtaining a set of one or more digital teeth anatomies;
- arranging the digital teeth anatomies and the digital 3D representation according to a preferred relative arrangement;
- deriving a restoration margin line of the digital restoration design at least partly from an intersection of the digital 3D representation and the digital teeth anatomies; and
- creating the digital restoration design based on portions of the digital 3D representation and of the digital teeth anatomies coronal to the restoration margin line.

The disclosed method, system, user interface provides the advantage over the prior art that digital restoration designs can be created without the operator needs to set the restoration margin line manually or at least with a minimal manual interaction.

A digital restoration design for the manufacture of a table-top restoration or a veneer can hence be created without the operator needing to manually set the restoration margin line of the table-top restoration or veneer.

A physical dental restoration can be manufactured based on the digital restoration design and the dental restoration can be arranged on the patient's teeth. In the context of the present invention, the phrases "the dental restoration" and "the manufactured dental restoration" refer to a dental restoration manufactured from the created digital restoration design.

The purpose of the dental restoration influences its target shape and thus the digital restoration design. The purpose may e.g. be to raise the patient's bite such that the target shape is directed towards increasing the length of the teeth to restore the patient's original occlusal table. Preferably a reasonable appealing shape of the teeth is maintained when the table-top restoration is seated in the mouth.

In the context of the present invention the phrase "raise the patient's bite" refers to the situation where the occlusal table of the teeth is shifted coronally, i.e. further away from the gingiva/tooth roots, when the dental restoration is seated at the teeth.

The purpose of the dental restoration may also be to improve the aesthetic appearance of the patient's set of teeth such that the target shape is directed towards an aesthetically appealing shape and arrangement of the dental restorations. A veneer is one example of such a dental restoration.

In the preferred relative arrangement the digital teeth anatomies and the digital 3D representation are arranged relative to each other according to an anatomical correct arrangement.

This provides the advantage that various digital operations, such as a Boolean subtraction of the digital 3D representation from the digital teeth anatomies when creating the digital restoration design. Further it provides that the digital teeth anatomies can be visualized together with the digital representation of the corresponding teeth, i.e. the teeth which the manufactured dental restoration(s) will be seated on.

Deriving the restoration margin line from the digital teeth anatomies with the digital teeth anatomies and the digital 3D representation arranged according to the preferred relative arrangement provides that the creation of the dental restoration design can be made highly automatic. The restoration margin line can be determined automatically without the need for the operator to use time to manually define the restoration margin line.

A patient's tooth can be prepared for a crown restoration by grinding away tooth material making space for the crown restoration. The prepared tooth is often referred to as a tooth stump since its size is significantly less than that of the unprepared tooth.

Table-top restorations are frequently used when the occlusal table of the patient's teeth is severely worn. The table-top restoration is shaped to be seated on top of the teeth where it raises the patient's bite. There is hence often no need for preparing the tooth by grinding away substantial amounts of tooth material. The same is true for the so-called minimum-preparation veneers which comprise a relatively thin layer of restoration material shaped to cover the labial and buccal surfaces of the teeth in order to improve the aesthetics of the teeth.

For the table-top restorations it may be advantageous to grind a small portion of tooth material away e.g. to remove dead tooth material or to provide good adhesion of the table-top restoration at the teeth. Such minimal prepared teeth are still referred to as unprepared teeth in this application.

In the case of a minimum-preparation veneer a thin layer of tooth material can be removed from the buccal/labial surface of the tooth to improve the adhesion of the veneer when this is seated at the teeth. This is however preferably a very thin layer such as a layer with a thickness of less than about 1 mm. Such minimal prepared teeth are also referred to as unprepared teeth in this application.

I.e. in the context of the present invention, the phrases "unprepared teeth" and "teeth in their unprepared state" refer to teeth which has undergone either none or minimal preparation.

When the dental restoration manufactured from the digital restoration design is arranged at the patient's teeth, the effective shape of the teeth is at least partly determined by the shape of the dental restoration. In the context of the present invention, the phrase "effective shape" is used to describe the outer surface of the teeth/restoration ensemble obtained when the dental restoration is seated at the patient's teeth.

For a table-top restoration, the occlusal table of the teeth/restoration ensemble is at least partly defined by the outer shape of the dental restoration, while for a minimum-preparation veneer the outer shape of the dental restoration at least partly defines the labial/buccal surface of the teeth/restoration ensemble.

The effective shape of the teeth with the dental restoration mounted is determined in part from the shape of the digital teeth anatomies and in part from the preferred relative arrangement of the digital teeth anatomies and the digital 3D representation. The digital teeth anatomies thus express a desired target shape of the part of the patient's teeth covered by the manufactured dental restoration.

In some embodiments the method comprises detecting a collision line from the intersection of the digital 3D representation and the digital teeth anatomies.

In some embodiments the restoration margin line of the digital restoration design is derived from the detected collision line.

The detection of the intersection or of a collision line and the deriving of the restoration margin line from the detected intersection or collision line are preferably performed by computer implemented algorithms executed on e.g. a microprocessor. This provides the advantage that the operator does not need to manually define the restoration margin line of the dental restoration or at least an initial guess of the restoration margin line such that the design process can be accelerated. This advantage is obtained e.g. in cases where there is no tooth preparation line that the restoration margin line must precisely adapt to. This is for instance the case when the manufactured dental restoration is to be arranged on a patient's unprepared teeth. In contrast, when the dental restoration is a crown or a bridge for a prepared set of teeth, the restoration margin line must preferably precisely match the tooth preparation line in order to avoid e.g. a grove at the transition between the dental restoration and the prepared tooth causing discomfort and the risk of bacteria being caught.

In some cases the operator may choose to make slight modifications to the derived restoration margin line but this is often not required. An example of such a modification is the smoothing of the restoration margin line to provide a smooth restoration margin line which is easier to manufacture.

In some embodiments, the restoration margin is derived at least partly from a curve defined on the digital 3D representation of the patient's unprepared teeth, where the defined curve is smoother than the intersection, i.e. the defined curve has a smaller variation than the intersection along the longitudinal axis of the teeth in the 3D representation of the unprepared teeth.

Using a smooth curve to define the restoration margin line provides the advantage that the dental restoration more easily can be manufactured from the digital restoration design. A dental restoration with a very jagged margin line will be more difficult to realize using CAM equipment than a restoration with a smooth margin line.

The curve may be defined by an operator using a pointing tool to draw the curve on a visualization of the digital 3D representation of the unprepared teeth in a user interface. If the intersection is illustrated in the user interface the operator may use the intersection as a guide and draw the curve e.g. as an average of the intersection.

The smooth curve can also be defined by applying a computer implemented smoothing algorithm to the intersection.

This provides the advantage that even less user interaction is required to set the restoration margin line.

Smoothing may also be applied to the derived restoration margin line making the restoration margin line smooth on the surface digital teeth anatomies. This has the same advantage as deriving the restoration margin line from a smooth curve, i.e. that the dental restoration more easily can be manufactured from the digital restoration design.

In some embodiments, the portion of the digital teeth anatomies based on which the outer surface of the digital restoration design is formed is by the defined curve, such as by projecting the curve onto the digital teeth anatomies.

When the smooth curve is defined on the digital 3D representation of the patient's unprepared teeth some parts of the curve may be displaced from the digital teeth anatomies. In such cases the restoration margin line may be derived by the projection of the curve onto the digital teeth anatomies.

The derived restoration margin line divides the digital teeth anatomies into a coronal part and a cervical/apical part, where the coronal part is used in forming the digital restoration design.

In some embodiments, the method comprises digitally removing portions of the digital teeth anatomies cervical/apical to the restoration margin line and using the thus truncated digital teeth anatomies in creating the digital dental design.

In the context of the present invention, the phrase "Item 1 being coronal to Item 2" refers to the situation where Item 1 is closer to the occlusal surface/incisal edge of a tooth than Item 2. In the context of the present invention, the phrase "Item 1 being cervical/apical to Item 2" refers to the situation where Item 1 is closer to the root part of the tooth, i.e. where item 2 is closer to the occlusal surface/incisal edge of a tooth than Item 1.

Using the part of the digital teeth anatomies coronal to the restoration margin line when creating the digital restoration design thus means that it is the part of the digital teeth anatomies which extends from the restoration margin line and over the occlusal surface/incisal edge which are used in creating the digital restoration design. The restoration margin line thus separates the coronal and cervical parts of the first digital teeth anatomies.

The restoration margin line may also separate the coronal and cervical portions of the teeth part of the digital 3D representation and in some embodiments the coronal portion of the digital 3D representation is thus bounded by the restoration margin line. In some embodiments, the method comprises digitally removing portions of the digital 3D representation cervical to the restoration margin line and using the thus truncated digital 3D representation when creating the digital dental design.

In some embodiments the creating of the digital restoration design comprises forming an inner surface and an outer surface of the digital restoration design, where the inner and outer surfaces are based on coronal portions of the digital 3D representation and of the digital teeth anatomies, respectively.

In some embodiments the coronal portion of the digital teeth anatomies is bounded by the restoration margin line.

In some embodiments an outer surface of the digital restoration design is formed at least partly based on portions of the digital teeth anatomies coronal to the restoration margin line.

The outer surface of the digital restoration design shapes the outer surface of the manufactured dental restoration and thus determines the effective shape of the teeth/restoration ensemble obtained when the manufactured dental restoration is seated at the teeth.

In some embodiments an inner surface of the digital restoration design is created at least partly from portions of the digital 3D representation of the unprepared teeth coronal to the restoration margin line.

The inner surface of the digital restoration design is configured for facing the existing teeth when the manufactured dental restoration is seated at the patient's teeth.

The inner and outer surfaces can be created from the coronal portions by simply copying these or by copying and modifying these according to the operators experience and preferences, e.g. by offsetting the copied surface.

In some embodiments, the inner surface of the digital dental design is at least partly created by copying the portion of the digital 3D representation coronal to the restoration margin line. In some cases an offset is applied to the copied surface in order e.g. to make space for cement used for attaching the dental restoration to the tooth/teeth, In some embodiments, the outer surface of the digital dental design is at least partly created by copying the portion of the digital teeth anatomies coronal to the restoration margin line In some embodiments, creating the digital restoration design comprises a Boolean subtraction of the digital 3D representation from the digital teeth anatomies.

The Boolean subtraction may be performed after the restoration margin line has been determined and optionally smoothed.

The intersection of the digital 3D representation and the digital teeth anatomies can be automatically defined in the Boolean subtraction. Creating the digital restoration design by such a Boolean subtraction has the advantage that the restoration margin line (derived from the intersection) can be determined automatically.

The shape and position of the restoration margin line depends on the digital teeth anatomies, the digital 3D representation and the preferred relative arrangement.

Deriving the restoration margin line may comprise a step of smoothing the intersection and/or smoothing the restoration margin line e.g. in case the Boolean subtraction results in a jagged restoration margin line which may make it difficult to manufacture the dental restoration.

In some embodiments, at least part of the inner surface of the digital restoration design is created at least partly by a Boolean subtraction of the digital 3D representation from the digital teeth anatomies.

A Boolean subtraction of a first solid digital structure from a second solid digital structure provides that a third solid digital structure is generated where the third solid digital structure is shaped according to the second solid digital structure where the parts shared with the first solid digital structure are removed.

When the digital 3D representation is subtracted from the digital teeth anatomies both these are thus preferably expressed as solid digital structures. I.e. if the obtained digital 3D representation is not already in the form of a solid digital structure, the method may comprise adapting the digital 3D representation to become a solid digital structure expressing the shape of the patient's teeth. When the digital 3D representation initially is an open surface a closing surface can be generated, e.g. using a loofting procedure, where the addition of the closing surface to the open surface of the digital 3D representation provides that it becomes a solid digital structure. The same is true for the digital teeth anatomies, where if the digital teeth anatomies are not already in the form of a solid digital structure, the method may comprise adapting these to become solid digital structures.

The Boolean subtraction of the solid digital structures may correspond to determining their relative complement, such that the digital restoration design resulting from the Boolean subtraction is the part of the digital teeth anatomies which is not shared with the digital 3D representation. Thereby the created inner surface of the digital restoration design is shaped according to the shape of the corresponding part of the digital 3D representation while the outer surface of the digital restoration design is shaped according to the shape of the digital teeth anatomies. The inner surface of the digital restoration design is thus at least in part created by determining the relative complement of the digital 3D representation in the digital teeth anatomies.

With the Boolean subtraction approach the restoration margin line is automatically defined at the same time as the inner and outer surfaces of the digital restoration design are formed.

An offset may be provided to the created inner surface of the digital restoration design to ensure space for cement between the patient's teeth and the manufactured dental restoration.

In some embodiments, the method comprises setting or determining an insertion direction of the dental restoration.

This provide the advantage that the digital restoration design can be optimized for a specific insertion direction and/or that it can be ensured that the manufactured dental restoration actually can be inserted at the patient's teeth.

In some embodiments, the method comprises adjusting the digital teeth anatomies, such as adjusting the digital teeth anatomies to provide a better fit of the dental restoration at the patient's teeth.

This is often required to provide that the digital restoration design not only has a desired shape but also the appropriate size for the patient. Also the collisions with the antagonist teeth can be optimized by the adjustment of the digital teeth anatomies.

In some embodiments, the placement of the digital teeth anatomies at the digital 3D representation of the unprepared teeth, the setting of the insertion direction and the adjustment of the digital teeth anatomies is an iterative process towards the optimum placement, size and shape of the digital teeth anatomies relative to the digital 3D representation of the unprepared teeth.

In some embodiments the method comprises examining the digital restoration design with respect to one or more minimum thickness criteria to identify any problematic regions.

A problematic region may be a region of the digital restoration design where the thickness is below that specified by the minimum thickness criteria. In the dental restoration manufactured from the digital restoration design the corresponding region will be so thin that the dental restoration will be fragile and/or difficult to manufacture.

Examining the digital restoration design with respect to one or more minimum thickness criteria provides the advantage that the operator can be warned that the current digital restoration design will provide a fragile dental restoration.

In some embodiments the method comprises adjusting the digital restoration design in the problematic regions to provide that the minimum thickness criteria are met in these regions.

This has the advantage that the dental restoration manufactured from the digital restoration design will be robust and have no fragile regions and/or that the restoration more easily can be manufactured using Computer aided manufacturing (CAM) equipment.

In some embodiments the adjusting comprises:
increasing the thickness of the digital restoration design in the problematic region such that the minimum thickness criteria are met, and/or
digitally removing the problematic region from the digital restoration design.

Both increasing the thickness of the digital restoration design and digitally removing the problematic region provide the advantage that the dental restoration manufactured from the digital restoration design can be made free of fragile regions where it otherwise may break and/or that the restoration more easily can be manufactured using Computer aided manufacturing (CAM) equipment.

In some embodiments the method comprises defining an offset surface by offsetting at least part of the digital 3D representation of the patent's unprepared teeth a distance according to the minimum thickness criteria. The offset is directed outwards relative to the surfaces of the digital 3D representation. For instance if a minimum thickness criterion dictates a minimum thickness of 0.2 mm the offset surface can be formed by offsetting the digital 3D representation by 0.2 mm.

The offset surface can be used when examining the digital restoration design to identify problematic regions where the minimum thickness criteria are not fulfilled. This can be realized by identifying the portions of the digital teeth anatomies or portions of the created digital restoration design which are located between the digital 3D representation and the offset surface. Such portions will not fulfill the minimum thickness criteria.

The offset surface can also be used in adjusting the digital restoration design to provide that the minimum thickness criteria are fulfilled for all regions. The problematic regions of the digital restoration design can e.g. be snapped onto the offset surface, i.e. shaped to follow the offset surface, whereby it is provided that the thickness of the digital restoration design is increased to a level where the minimum thickness criteria also are fulfilled in those regions. I.e. in some embodiments, increasing the thickness of the digital restoration design in the problematic region comprises forming an offset surface from the digital 3D representation, where the offset is determined from the minimum thickness criteria.

The offset surface can initially be used for evaluating whether there are any problematic regions. If problematic regions are found, the offset surface can be used for the adjustment of the digital restoration design such as by modifying the digital restoration design to follow the offset surface at least in part of the problematic regions.

In some embodiments, the adjusting comprises shaping the digital restoration design according to the offset surface in at least part of the problematic regions.

In some embodiments, the examination comprises identifying the problematic regions as the regions of the digital restoration design where the digital restoration design is between the offset surface and the digital 3D representation.

In some embodiments the digital restoration design is for manufacture of the dental restoration by milling and the method comprises adjusting the digital restoration design to provide for drill compensation.

In the context of the present invention, the phrase "to provide for drill compensation" refers to the case where the digital restoration design is adjusted such that the shape of the drill which is to be used in the manufacture of the dental restoration is taken into consideration.

When the tip of the drill has a curvature it cannot form e.g. a 90 degrees bend. When attempting to form sharp bends some material will be remaining. For a dental restoration with an inner surface shaped to match the occlusal surface of the (unprepared) teeth this remaining material may collide with the tooth and prevent the dental restoration from being seated at the tooth.

In some embodiments the drill compensation is provided by introducing one or more indentations in the digital restoration design This is advantageous since the indentation can be arranged such that any remaining material after the milling does not prevent the dental restoration from being seated at the tooth.

In some embodiments, the cross-sectional size of the indentation is chosen to be larger than or equal to the diameter of the drill which is to be used in the manufacture of the dental restoration. For an indentation with a circular cross-section, the cross sectional size is the diameter of the indentation.

In some embodiments the digital restoration design is digitally adjusted at least on the inner surface of the digital restoration design. I.e. the drill compensation is provided at the inner surface of the digital restoration design.

This provides the advantage that the manufactured dental restoration can be seated at the unprepared teeth.

The drill compensation can in some cases cause the manufactured dental restoration to be fragile at the indentation. Accordingly in some embodiments the position of the indentation is determined based on the thickness of the digital restoration design, i.e. the distance from the inner to the outer surface of the digital restoration design. This can be realized by determining an expected thickness of the digital restoration design and/or of the manufactured dental restoration. This expected thickness of the digital restoration design and the manufactured restoration may be different due to a curved tip of the drill. If the expected thickness with the indentation formed in one position is below a lower limit the expected thickness may be determined for one or more other positions of the indentation and the position of the indentation can be decided therefrom. An expected thickness distribution for the relevant parts of the digital restoration design can also be calculated and visualized using e.g. a color map indicating where the indentation can be placed to compensate for the finite drill size without making the dental restoration fragile.

Such drill compensation can be performed regardless of how the digital restoration design is created i.e. also without the restoration margin line being determined from an intersection of digital teeth anatomies and a digital 3D representation of the patient's unprepared teeth.

In some embodiments the method comprises adjusting the curvature of the digital restoration design at the restoration margin line to match the curvature of the digital 3D representation of the patient's teeth.

Matching the curvatures of the digital restoration design and the digital 3D representation at the restoration margin line may improve the appearance of the teeth/restoration ensemble. A large mismatch in curvature can make the interface between the dental restoration and the teeth clearly visible. The curvature adjustment provides a smoother and less visible transition from teeth to dental restoration at the restoration margin line.

In some embodiments, the digital restoration design is for the manufacture of a set of table-top teeth for raising the occlusal table of the patient's teeth.

The target shape then corresponds to a raise of the occlusal surface/incisal edge of the teeth. The effective size of the teeth increases along the longitudinal axis of the teeth when the manufactured dental restoration is seated at the teeth. The desired target shape of the patient's teeth expressed by the obtained digital teeth anatomies is then such that the effective size of at least one tooth is increased when the manufactured restoration is seated at the teeth.

The table-top teeth can be a temporary restoration worn by the patient for a period of time in which period the patient's muscles are trained for the raised bite. This may be applicable to patients having problems with the temporomandibular joint (TMJ) and where the occlusal surface of e.g. the teeth of the mandibular jaw must be raised to treat the problem. After a period of time, e.g. some months, the dentist evaluates whether the raised bite is appropriate and solves the TMJ problems. If the temporary restoration has proven to have the adequate shape to provide the needed lift of the patient's bite a permanent restoration can be manufactured based on the same digital restoration design used for the temporary restoration.

In some embodiments the digital restoration design is for the manufacture of a minimum-preparation veneer.

The digital restoration design is then adapted to provide that the manufactured veneer can be arranged at the patient's minimum-prepared teeth, such as at the patients unprepared teeth, and cover at least partially the buccal/labial surface of the teeth. The digital restoration design may be such that the veneer improves the aesthetic appearance of the patient's set of teeth.

In some embodiments obtaining the digital teeth anatomies comprises selecting a set of library teeth.

This has the advantage that the digital teeth anatomies can be obtained faster than when the operator himself designs the surfaces of the digital teeth anatomies.

In some embodiments obtaining the digital teeth anatomies comprises copying an occlusal surface of the digital 3D representation and forming the digital teeth anatomies based on the copied occlusal surface.

This may e.g. be realized by offsetting one or more occlusal and/or incisal surfaces of the digital 3D representation and digitally forming a connecting surface configured for connecting the offset surfaces and the remaining part of the digital 3D representation.

Copying the occlusal surface of the existing teeth to the digital teeth anatomies may be advantageous when the existing teeth have an acceptable shape but the teeth are to short such that the patient's bite must be raised.

Disclosed is method for creating a digital restoration design for the manufacture of a dental restoration for one or more of a patient's teeth where minimal manual interaction is required when setting the restoration margin line, where the method comprises:

obtaining a digital 3D representation of the patient's unprepared teeth;

obtaining a set of one or more digital teeth anatomies;

arranging the digital teeth anatomies and the digital 3D representation according to a preferred relative arrangement; and creating an inner surface and an outer surface of the digital restoration design, where the inner and outer surfaces are based on coronal portions of the digital 3D representation and of the digital teeth anatomies, respectively.

Disclosed is method for creating a digital restoration design for the manufacture of a dental restoration for one or more of a patient's teeth where minimal manual interaction is required when setting the restoration margin line, where the method comprises:

loading a digital 3D representation of the patient's unprepared teeth into a data processor;

loading a set of one or more digital teeth anatomies into the data processor, where the digital teeth anatomies; and using said data processor to execute computer implemented algorithms configured for creating a digital restoration design comprising a restoration margin line, where the restoration margin line is derived at least partly from an intersection of the digital 3D representation and the digital teeth anatomies.

Disclosed is a user interface for creating a digital restoration design for the manufacture of a dental restoration for one or more of a patient's teeth where minimal manual interaction is required when setting the restoration margin line; where the user interface is configured for:

obtaining and visualizing a digital 3D representation of the patient's unprepared teeth;

obtaining and visualizing a set of one or more digital teeth anatomies;

arranging the digital teeth anatomies and the first digital 3D representation according to a preferred relative arrangement; and creating a digital restoration design comprising a restoration margin line, where the restoration margin line is derived at least partly from an intersection of the digital 3D representation and the digital teeth anatomies.

In some embodiments, the user interface comprises a virtual push button configured for creating the digital restoration design when activated.

The digital restoration design can be created using a method according to any of the embodiments. For example the digital restoration design can be created based on a Boolean subtraction offering the opportunity to create the digital restoration design with minimal manual interaction when setting the restoration margin line of the digital restoration design.

In some embodiments, the user interface is configured for being visualized to an operator using a visual display unit and for allowing an operator to enter data into and make choices presented in the user interface by means of a computer keyboard or a computer mouse.

In some embodiments, the user interface comprises a data entering section for entering data relating to e.g. whether the digital restoration design is to be created using Boolean subtraction.

In some embodiments, the user interface is configured for visualizing the intersection between the digital 3D representation and the digital teeth anatomies.

In some cases the dental restoration manufactured from the digital restoration design is a temporary dental restoration for the patient's unprepared teeth, such as a temporary table-top restoration, which the patient wears for a period of time to e.g. raise his bite and train his muscles to the raised bite. After this period, the dentist may choose to prepare the patient's teeth for a permanent restoration by e.g. grinding away teeth material.

In the following the digital restoration design for the temporary and the permanent restorations are referred to as a first and a second digital restoration design, respectively.

The first digital restoration design created for the temporary dental restoration can also be used later in processes for creating a second digital restoration design for the permanent dental restoration. For a table-top restoration the second dental restoration then preferably shaped such that it can be seated at the prepared tooth and its occlusal table is located according to the occlusal table of the temporary table-top restoration.

Disclosed is a method for creating a first digital restoration design for a patient's unprepared teeth and a second digital restoration design for the teeth after these have been prepared, where the method comprises:

obtaining a first digital 3D representation of the patient's unprepared teeth;

obtaining a set of one or more digital teeth anatomies;

arranging the digital teeth anatomies and the first digital 3D representation according to a preferred relative arrangement;

creating a digital restoration design comprising a restoration margin line, where the restoration margin line is derived at least partly from an intersection of the digital 3D representation and the digital teeth anatomies;

obtaining a second digital 3D representation of the patient's prepared teeth;

identifying a tooth preparation line on the second digital 3D representation; and creating a second digital restoration design based on the first digital restoration design and/or on the digital teeth anatomies, where the creating comprises generating a connecting surface configured for connecting the tooth preparation line and the first digital restoration design and/or the digital teeth anatomies.

The second digital 3D representation relates to the shape of the patient's teeth after tooth material has been removed to prepare the teeth for the permanent dental restoration. When the dental restoration is a table-top set of teeth, the temporary dental restoration is used for training the patient's jaw muscles and testing whether the occlusal table of the temporary restoration is appropriate for the patient's occlusion. When creating the second digital restoration design for the permanent dental restoration it preferably takes into account the first digital restoration design, either by directly copying this or by taking this as a starting point which is adjusted based on the patient's experience using the temporary table-top teeth.

The connecting surface and part of the first digital restoration design and/or on the digital teeth anatomies form at least part of the outer surface of the second digital restoration design. The outer surface of the second digital restoration design thus terminates at the tooth preparation line which becomes the restoration margin line of the permanent dental restoration.

In some embodiments, the inner surface of the second digital restoration design is at least partly created from the part of the second digital 3D representation corresponding to the prepared teeth which the permanent restoration will engage in the patient's mouth. This may involve copying the relevant part of the second digital 3D representation and optionally applying an offset to make space for cement used to attach the permanent dental restoration to the prepared teeth. This provides that the second dental restoration manufactured from the second digital restoration design can be arranged at the prepared teeth.

The first digital restoration design can be created based on the first digital 3D representation and the digital teeth anatomies using any of the disclosed embodiments for doing so.

Disclosed is a method for creating a second digital restoration design for the manufacture of a dental restoration for one or more of a patient's prepared teeth based on a first digital restoration design created for the patient's unprepared teeth, where the method comprises:
- obtaining a first digital restoration design;
- obtaining a second digital 3D representation of the patient's prepared teeth;
- identifying a tooth preparation line on the second digital 3D representation; and
- creating the second digital restoration design, where the creating comprises generating a connecting surface configured for connecting the tooth preparation line and the first digital restoration design.

In some embodiments, the first digital restoration design is for the manufacture of a dental restoration configured for increasing the size of at least one of the patient's unprepared teeth, such as for the manufacture of a set of table-top teeth or a minimum-preparation veneer.

In some embodiments the connecting surface contacts the first digital restoration design at a contact line which is arranged coronal to the restoration margin line of the first digital restoration design. The part of the first digital restoration design coronal to the contact line then preferably forms part of the outer surface of the second digital restoration design while the portion of the connecting surface between the contact line and the tooth preparation line forms another portion of the outer surface.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

FIG. 1 shows examples of workflows according to embodiments of the method according to the invention.

Figure 1A:
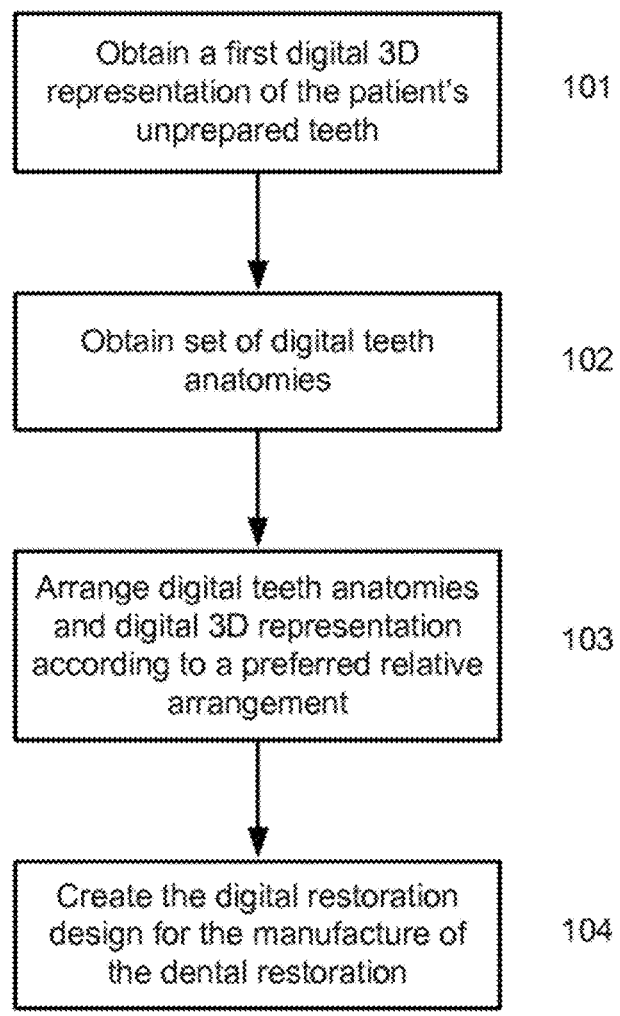
FIGS. 1A through 1D show exemplary workflows for the method according to the invention.

FIG. 1A illustrates a workflow 100 according to one embodiment of the invention.

In step 101 a digital 3D representation of the patient's unprepared teeth is obtained. The digital 3D representation can e.g. be obtained using an intraoral 3D scanner such as the TRIOS intraoral scanner provided by 3shape A/S where the teeth are scanned directly in the patient's mouth. The digital 3D representation can also be obtained by scanning an impression of the teeth or by scanning a physical model of the teeth obtained using such an impression.

The digital 3D representation can be of the patient's entire set of teeth or a part of the set of teeth, such as a part of the teeth in the upper and/or lower jaw. The digital 3D representation provides information relating to at least the geometry of the teeth.

In step 102 a set of one or more digital teeth anatomies is obtained. The digital teeth anatomies are a set of library teeth selected from a library of digital template teeth and express a desired target shape of the patient's teeth when the dental restoration is seated thereon. The target shape is such that the size of at least one tooth is increased when the manufactured dental restoration is arranged at the teeth.

When the patient has worn his teeth excessively such that the length of the teeth is significantly reduced, the dentist may choose to design and manufacture a table-top restoration for the patient. The table-top restoration is then designed to restore the original length of the teeth and hence the original occlusal table of the teeth. This is referred to as raising the patient's bite.

If the occlusal table of the patient's teeth have a suitable shape (e.g. have an anatomically acceptable occlusion with the antagonist teeth) but the teeth are too short, the dentist may wish to copy the occlusal table of the existing teeth to the digital teeth anatomies. This can be provided in various ways such as by offsetting the one or more occlusal and/or incisal surfaces of the digital 3D representation and digitally forming a connecting surface configured for connecting the offset surfaces and the remaining part of the digital 3D representation.

When the patient is not pleased with the appearance of his teeth he may wish to have a veneer designed and manufactured for his teeth. The patient may still have all his teeth in their original and unprepared shape but desires a more appealing smile. The digital restoration design can then be created such that the veneer manufactured therefrom can be seated on the unprepared teeth covering parts of the buccal/labial surfaces of the teeth where it provides an improved aesthetic of the smile.

The antagonist teeth can be taken into consideration when designing digital teeth anatomies. This can included analyzing the occlusion of the digital teeth anatomies with a digital 3D representation of the antagonist teeth using e.g. a virtual articulator to mimic the relative movement of the patient's jaws in a bite.

In step 103, the digital teeth anatomies and the digital 3D representation are arranged in relation to each other according to a preferred relative arrangement.

The digital 3D representation can be arranged/expressed in a coordinate system, such as the coordinate system of a virtual articulator used for digitally analyzing the relative movement of the patient's jaws and teeth during a bite. Arranging the digital teeth anatomies and the digital 3D representation in relation to each other may then comprise expressing them in the same coordinate system.

One way of arranging the digital teeth anatomies and the digital 3D representation in relation to each other is to determine a transformation matrix for mapping the two into the same coordinate system. This may e.g. be a transformation matrix for mapping the digital teeth anatomies into the coordinate system of the digital 3D representation, or vice versa. It may also be transformation matrices for mapping the two into another coordinate system, such as the coordinate system of a virtual articulator used for digitally analyzing the relative movement of the patient's mandibular and maxillary teeth during jaw motion.

When the digital teeth anatomies and the digital 3D representation are expressed in the same coordinate system they can also be visualized to an operator using e.g. a computer screen.

The digital teeth anatomies are arranged in relation to the digital 3D representation according to the way the manufactured dental restoration is to be placed relative to the patient's unprepared teeth.

For a table-top set of teeth the preferred relative arrangement of the digital teeth anatomies and the digital 3D representation is such that the occlusal table of the digital teeth anatomies is located according to the desired location of the occlusal table of the dental restoration relative to the patient's teeth.

An insertion direction for the insertion of the dental restoration at the patient's unprepared teeth is also set or determined. With knowledge of the insertion direction it can be verified that the digital restoration design is such that the manufactured dental restoration actually can be placed at the patient's unprepared teeth.

In step 104 the digital restoration design is created. The digital restoration design comprises a restoration margin line and the method comprises deriving the restoration margin line from an intersection of the digital 3D representation and the digital teeth anatomies. The digital restoration design is created with minimal user interaction in setting the restoration margin line of the dental restoration, i.e. a dentist or dental technician performing the method needs to spend less or no time in setting the restoration margin line.

Then digital teeth anatomies has been loaded from a library of template anatomies an adjustment of the digital teeth anatomies is often required e.g. to provide a better fit of the dental restoration at the patient's teeth.

The insertion direction, the arrangement and adjustment of the digital teeth anatomies can be performed in an iterative process to obtain the most satisfactory result.

Figure 1B:
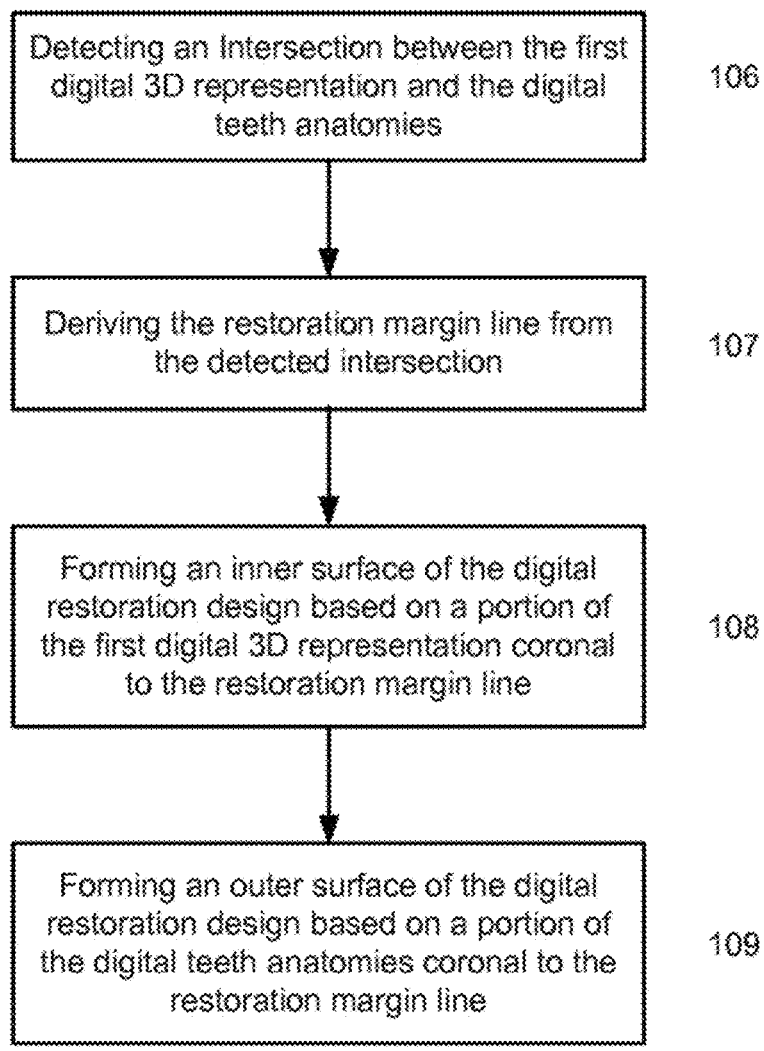

FIG. 1B illustrates steps of a workflow 105 for creating the digital restoration design based on the intersection.

In step 106 the intersection between the digital 3D representation and the digital teeth anatomies is determined using computer implemented surface-surface intersection algorithms which e.g. return a 3D spline expressing the shape and position of the intersection relative to the digital 3D representation and/or relative to the digital teeth anatomies.

In step 107 a restoration margin line of the digital restoration design is derived from the intersection.

This can be done simply by copying the intersection, such that the restoration margin line is automatically derived without the need of an operator setting it manually. In some cases the operator may choose to make slight modifications to the intersection before deriving the restoration margin line. If the intersection is highly jagged the operator can decide to define a smooth curve on the digital 3D representation of the unprepared teeth following the overall shape of the intersection but avoiding the peaks and valleys in the jagged intersection. The restoration margin line is then subsequently derived from the smooth curve and the created digital restoration design will have a margin line which more easily can be manufactured using CAM equipment.

On the digital 3D representation of the unprepared teeth, the restoration margin line separates a coronal portion and a cervical portion of the digital 3D representation, such that the coronal portion of the digital 3D representation is bounded by the restoration margin line. In step 108 an inner surface of the digital restoration design is formed based on the coronal portion of the digital 3D representation.

On the digital teeth anatomies, the restoration margin line separates a coronal portion and a cervical portion of the digital teeth anatomies, such that the coronal portion of the digital teeth anatomies is bounded by the restoration margin line. In step 109 an outer surface of the digital restoration design is formed based on the coronal portion of the digital teeth anatomies.

With the outer and inner surface of the digital restoration design formed, a solid digital structure for the digital restoration design can be formed by closing any gap between the inner and outer surface at the restoration margin line, e.g. by forming a connecting surface using a computer implemented loofting algorithm.

Figure 1C:
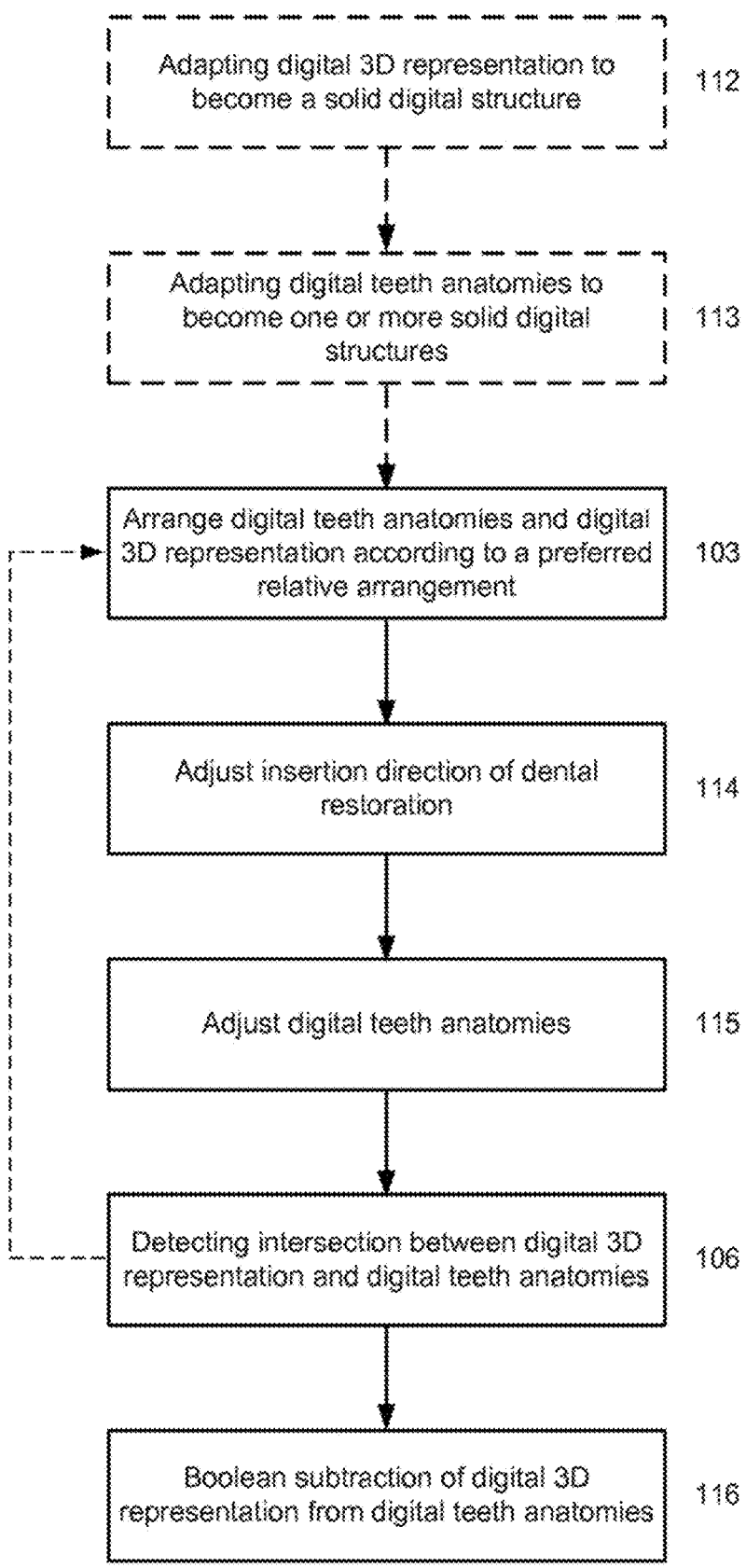

FIG. 1C illustrates steps of a workflow 111 for creating the digital restoration design by a Boolean subtraction.

In step 112 the digital 3D representation is adapted to become a solid digital structure. The digital 3D representation can e.g. be a polygonal mesh provided by a 3D scanner and provides information relating to the geometry/shape of the patient's teeth and possibly the surrounding gingiva. From this polygonal mesh a digital solid structure for the digital 3D representation can be formed. The formed solid digital structure can be used in Constructive Solid Geometry (CSG) for creating the digital restoration design using e.g. a computer implemented Boolean subtraction algorithm.

In some cases, the digital 3D representation obtained from the 3D scanner is already a solid digital structure such that step 112 not is required.

In step 113 the digital teeth anatomies are adapted to become one or more solid digital structures. Often the digital teeth anatomies selected from a teeth library are already in the form of one or more solid digital structures such that step 113 not is required.

In step 103, the digital teeth anatomies and the digital 3D representation are arranged according to a preferred relative arrangement as described above in relation to FIG. 1A.

In step 114 the insertion of the dental restoration is adjusted and in step 115 the digital teeth anatomies are adjusted. These adjustments are made in order to obtain the best design of the dental restoration with respect to shape and function of the dental restoration and to ensure that the manufactured restoration can be inserted at the teeth.

In step 106 the intersection of the digital teeth anatomies and the digital 3D representation is detected as also described above in relation to FIG. 1A.

The operator may choose to iteratively adjust the relative arrangement, the insertion direction, and the digital teeth anatomies until a satisfactory result is obtained. The detection of the intersection can be a part of such an iterative loop or the intersection can be detected after the loop.

In step 116 the digital restoration design is created by a Boolean subtraction of the digital 3D representation from the digital teeth anatomies.

The inner surface of the digital restoration design, i.e. the surface which for the manufactured dental restoration will face the patient's teeth, is then shaped according to the surface of those teeth. A gap may be introduced to allow some space for an adhesive agent, such as cement, used for securing the dental restoration at the teeth.

The Boolean subtraction corresponds to determining the relative complement of the digital 3D representation in the digital teeth anatomies. The resulting digital restoration design is thus the part of the digital teeth anatomies which is not shared with the digital 3D representation.

The outer surface of the digital restoration design is defined by the outer surface of the digital teeth anatomies.

Figure 1D:
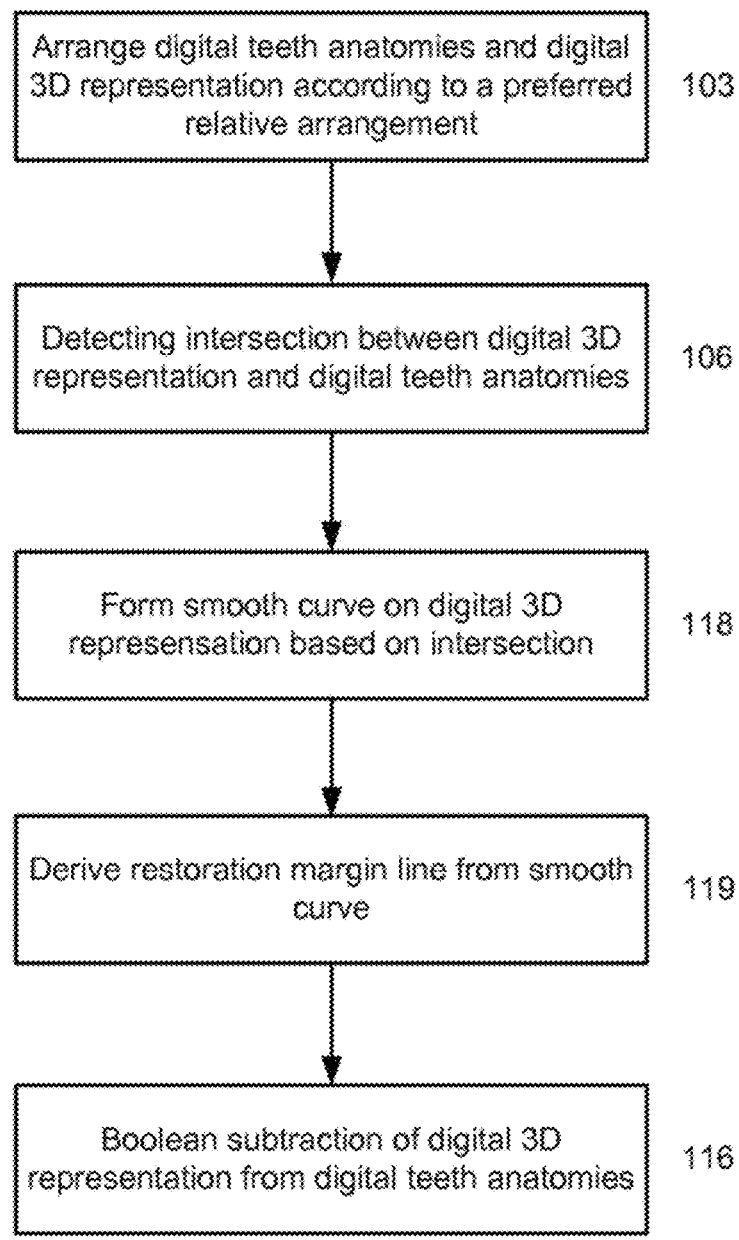

FIG. 1D illustrates steps of a workflow 117 where the restoration margin line is derived from a smooth curve.

In steps 103 and 106, the digital teeth anatomies and the digital 3D representation are arranged according to a preferred relative arrangement and the intersection is detected as also described above in relation to FIG. 1A.

Often in situations where the intersection is highly jagged the operator will decide that it will be difficult to manufacture a dental restoration from a digital restoration design with such a restoration margin line. In such cases the operator can choose to form a smooth curve on the digital 3D representation of the unprepared teeth based on the detected intersection in step 118 and then derive the restoration margin line from the smooth curve in step 119.

The restoration margin line can e.g. be defined by projecting the smooth curve onto the digital teeth anatomies.

In step 116 the digital restoration design is created by a Boolean subtraction of the digital 3D representation from the digital teeth anatomies as described in relation to FIG. 1C.

Figure 2:
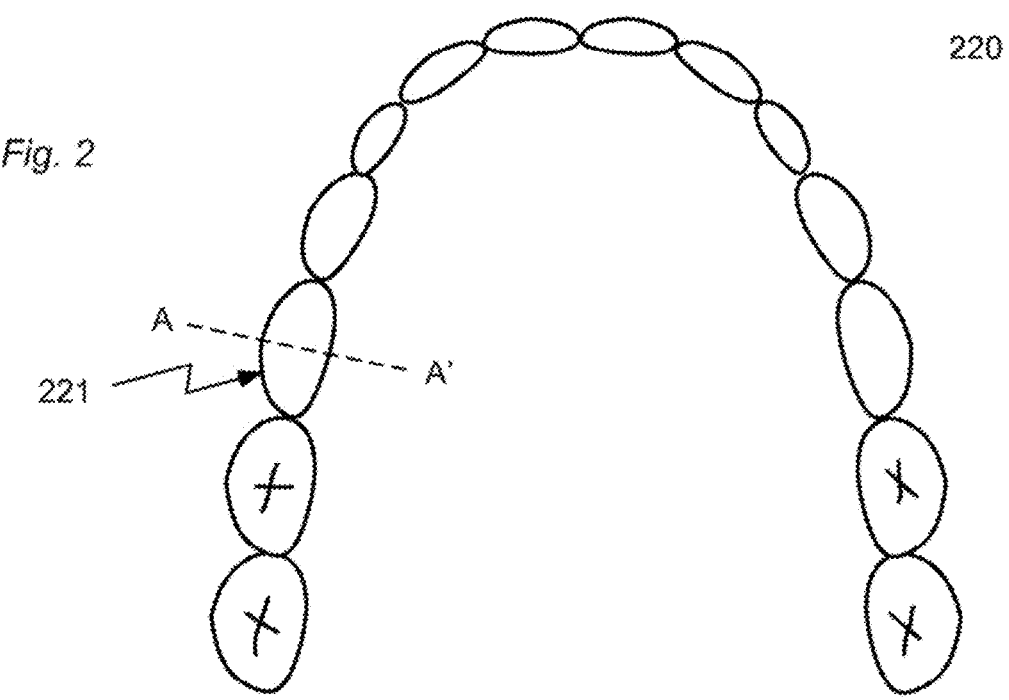
FIG. 2 shows a schematic of the teeth in one of the patient's jaws.

FIG. 2 shows a schematic of the teeth in one of the patient's jaws.

The schematic shows the unprepared teeth 220 with anterior teeth in the top of the figure and molars at the bottom. A cross sectional plane is defined by the line A-A' crossing one tooth 221 and the normal to the occlusal plane of the set of teeth, i.e. the cross sectional plane is perpendicular to the patient's occlusal plane.

FIGS. 3 to 10 show schematics of digital 3D representations of the unprepared teeth, digital restoration designs and different surfaces depicted as cross sections in a plane such as the one defined in FIG. 2.

Figure 3:
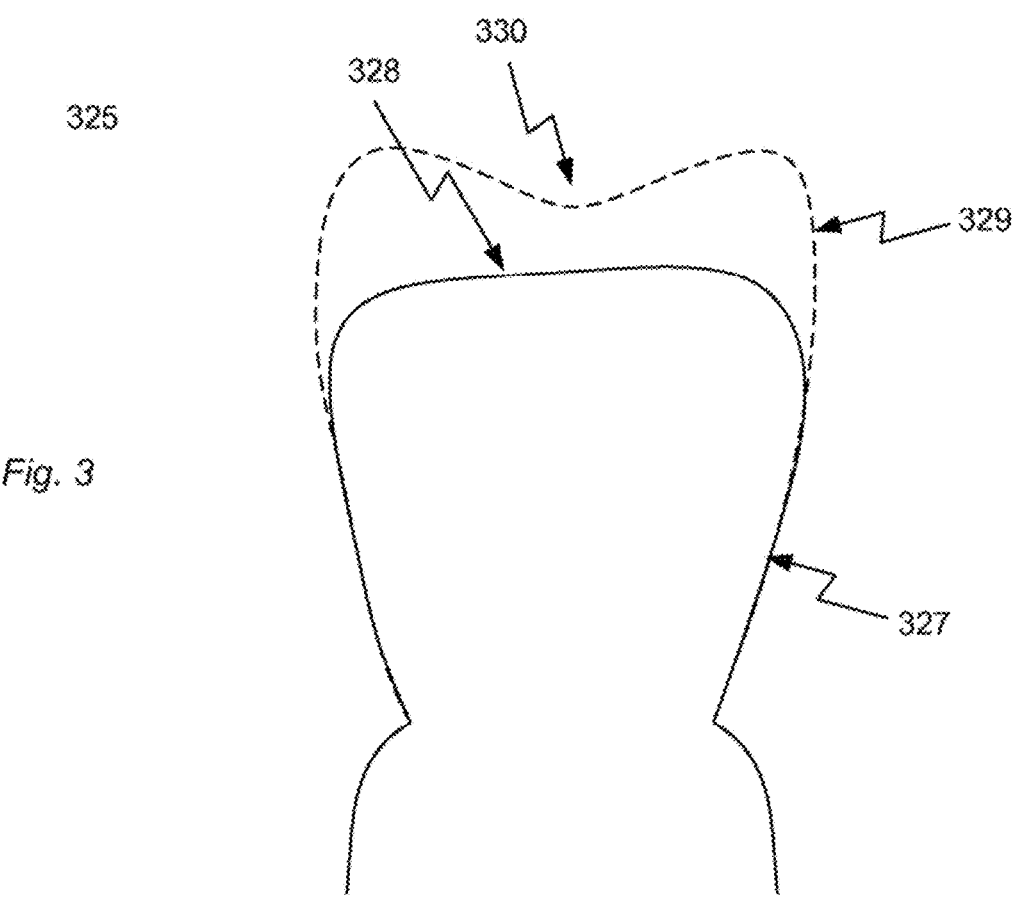
FIG. 3 shows a schematic of a cross-section of the patient's teeth.

FIG. 3 shows a schematic of a cross-section 325 of the patient's teeth at the A-A' plane seen in FIG. 2. The full line shows the shape of the unprepared teeth in their current state 327 while the dotted line shows the original shape of the teeth. The teeth are severely worn so that the current occlusal table 328 is much lower than the original occlusal table 330. This causes discomfort to the patient and an unnatural strain on the muscles active during e.g. mastication.

Figure 4:
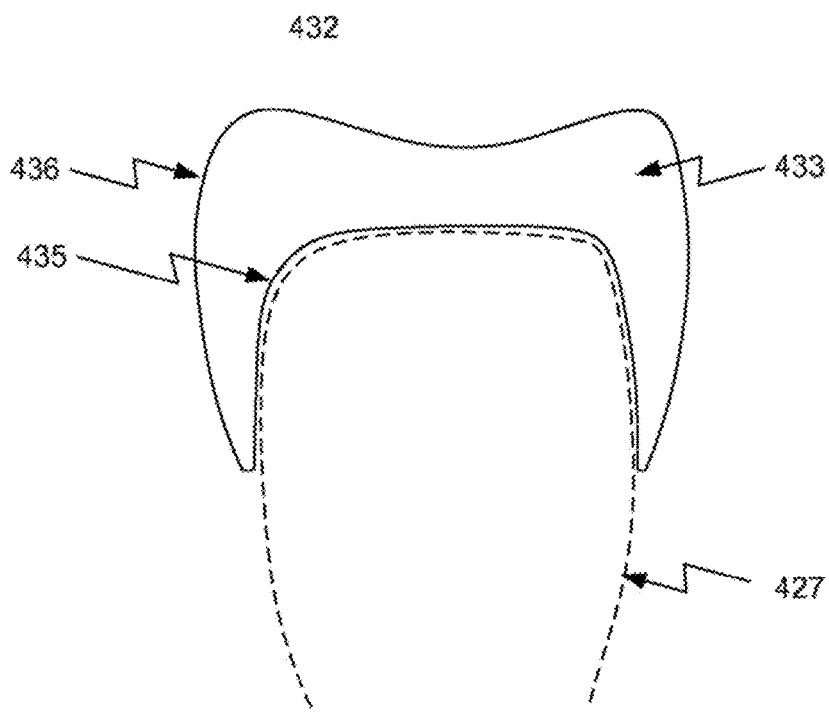
FIG. 4 shows a schematic of a manufactured table-top restoration.

FIG. 4 shows a schematic of a teeth/restoration ensemble 432 with a manufactured table-top restoration arranged on the worn tooth illustrated in FIG. 3.

The table-top restoration 433 is designed to raise the occlusal table of the unprepared tooth 427. It has an inner surface 435 shaped to engage the surface of the unprepared tooth 427 and an outer surface 436 shaped to engage the antagonist teeth when the patient's bites. The table-top restoration 433 increases the length of the patient's teeth and when the patient uses the restoration the muscles get used to the raised bite defined by the set of table-top teeth.

In a dental restoration manufactured from the digital restoration design using direct digital manufacture techniques such as CAM drilling, the restoration margin line of the dental restoration is defined by the restoration margin line of the digital restoration design. However, in some cases the dentist may also chose to perform an additional step of polishing or grinding restoration material away such that the restoration margin line is offset from that defined on the digital restoration design.

Figure 5A:
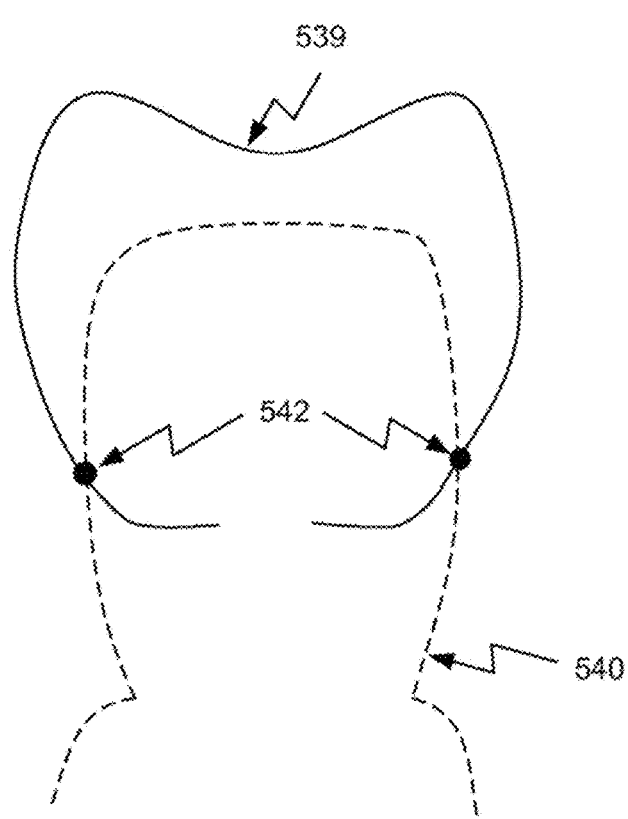
FIGS. 5A and 5B illustrate detecting the intersection to create the digital restoration design.

FIG. 5 illustrates creating a digital restoration design for a table-top restoration using the detected intersection.

The digital teeth anatomies 539 are arranged in relation to the digital 3D representation 540 according to the preferred relative arrangement in which the surface of the digital teeth anatomies is located such that the table-top restoration raises the patient's bite. The digital teeth anatomies and the digital 3D representation can be arranged relative to each other by expressing the digital teeth anatomies in the same coordinate system as the digital 3D representation.

The digital teeth anatomies can be obtained from a library of template teeth based on the dentist's preference.

The intersection 542 is determined using a computer implemented algorithm configured for detecting surface-surface intersections applied to the digital 3D representation and the digital teeth anatomies. The intersection can be expressed as a 3D spline having the shape and position of the intersection relative to the digital teeth anatomies and/or the digital 3D representation of the teeth.

The restoration margin line 546 of the digital restoration design can then derived by copying the determined intersection. The digital teeth anatomies 539, the digital 3D representation 540, and the intersection 542 and/or restoration margin line 546 can be visualized to the operator in a user interface displayed on e.g. a computer screen.

The restoration margin line derived by copying the intersection may be adjusted using appropriate computer implemented algorithms such as an algorithm configured for smoothing the restoration margin line. If the operator prefers to adjust the restoration margin line manually he may do so using e.g. a computer mouse to drag sections of the restoration margin line according to his preferences. But this manual step is completely voluntary and the digital restoration design can be created without the operator setting the restoration margin line himself.

Figure 5B:
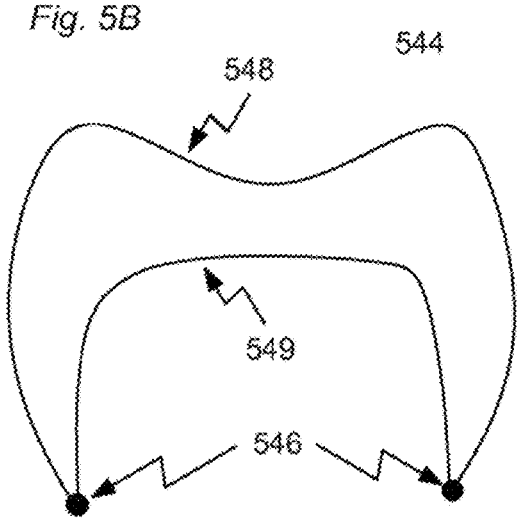

FIG. 5B shows a schematic of the created digital restoration design 544. When the restoration margin line 546 has been defined, the outer surface and inner surface 549 of the digital restoration design 544 are derived from the parts of the digital teeth anatomies 539 and the digital 3D representation 540 coronal to the restoration margin line 546.

FIG. 6 illustrates using Boolean subtraction of solid digital structures in creating a digital restoration design for a table-top restoration.

Figure 6A:
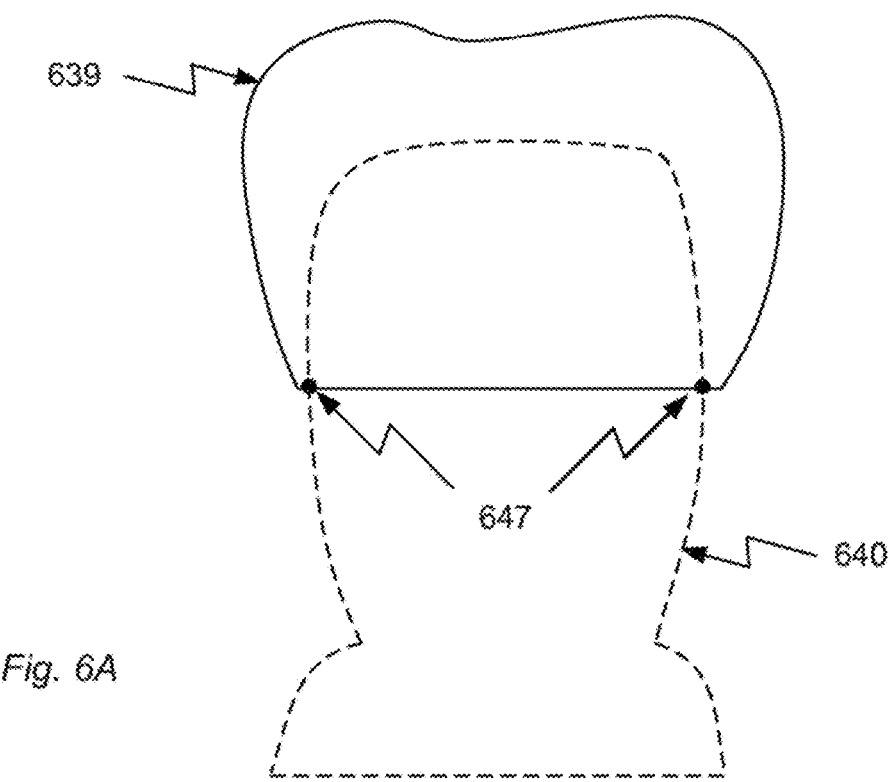
FIGS. 6A and 6B illustrate creating a digital restoration design by a Boolean subtraction.

In FIG. 6A the obtained digital teeth anatomies 639 and the digital 3D representation 640 are in the form of digital solid structures. The two solid digital structures are arranged in a common coordinate system according to their preferred relative arrangement in which their intersection 642 is as indicated in the Figure.

The common coordinate system may e.g. be that in which the digital 3D representation already is expressed. The digital restoration design is then created by a Boolean subtraction of the digital 3D representation from the digital teeth anatomies as described in relation to FIG. 1C.

Figure 6B:
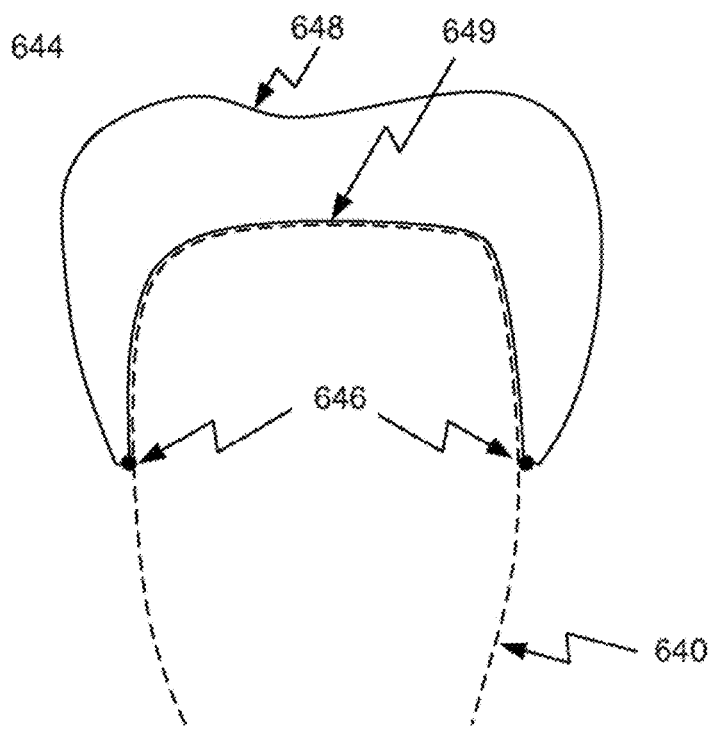

In FIG. 6B the digital restoration design 644 created by the Boolean subtraction is illustrated together with the digital 3D representation of the patient's unprepared teeth. The outer surface 648 of the digital restoration design 644 is shaped according to the shape of the digital teeth anatomies 639. The shape of the digital teeth anatomies and their preferred relative arrangement with respect to the digital 3D representation determines the shape of the occlusal table of the manufactured dental restoration. The inner surface 649 is shaped according to the shape of the digital 3D representation such that the manufactured dental restoration can be seated at the unprepared teeth. If undercut regions are formed in the digital restoration design, these may be virtually blocked out to ensure that the restoration can be seated on the unprepared teeth.

FIG. 7 illustrates how the digital restoration design can be adjusted to fulfill a minimum thickness criterion.

Figure 7A:
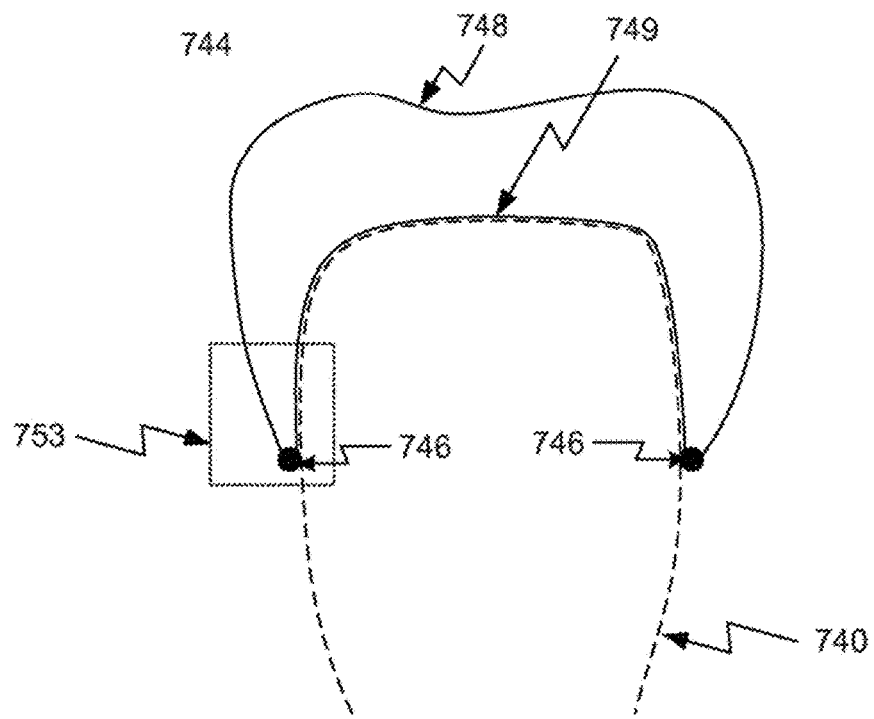
FIGS. 7A through 7D illustrate adjustment of the digital restoration design to fulfill a minimum thickness criterion.

FIG. 7A shows a schematic of the digital restoration design 744 together with the digital 3D representation 740 of the unprepared tooth for which it is created. The digital restoration design 744 has the outer surface 748 and inner surface 749 created using e.g. the Boolean subtraction described in relation to FIG. 6. In FIG. 7A a frame 753 is indicated at the part of the restoration margin line 746 seen in the left side of the figure.

Figure 7B:
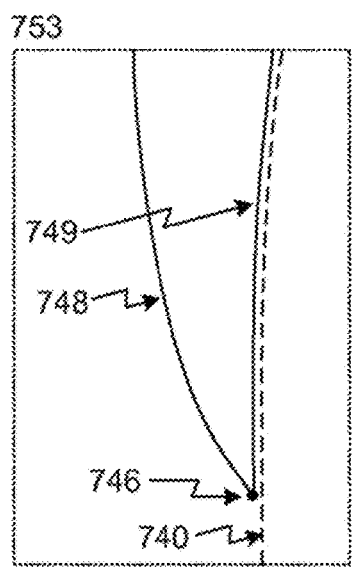
Figure 7C:
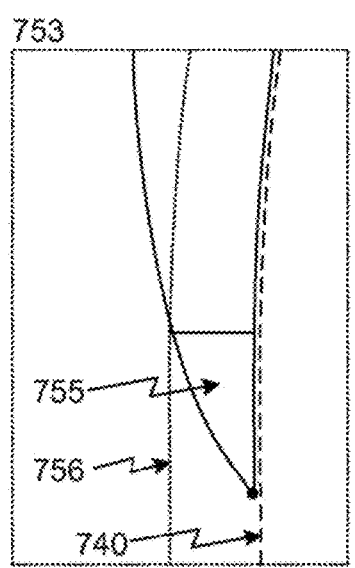
Figure 7D:
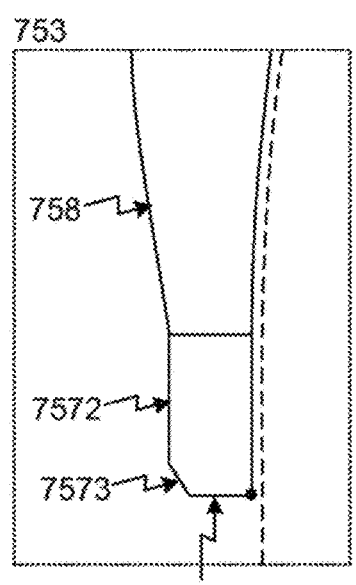

FIGS. 7B-7D shows a close-up of the frame 753 and how the digital restoration design can be adjusted to fulfill a minimum thickness criterion.

In FIG. 7B it is seen that the thickness of the digital restoration design, i.e. the distance between the outer surface 748 and the inner surface 749 is very little at the restoration margin line 746. In fact the digital restoration design tapers off near the restoration margin line which both is very difficult to realize with e.g. drilling technology and which causes the digital restoration design to be very fragile in this region.

The problematic region 755 of the digital restoration design illustrated in FIG. 7C is identified by examining the digital restoration design with respect to one or more minimum thickness criteria, e.g. that the thickness must not be less than a minimum value. The minimum thickness can e.g. be 0.2 mm. The problematic region can e.g. be identified by defining an offset surface 756 from the digital 3D representation at a distance according to the minimum thickness criteria and determining which regions of the digital restoration design are located between the digital 3D representation 740 and the offset surface 756.

In FIG. 7D is illustrated one way of adjusting the digital restoration design in the problematic region to provide that the minimum thickness criterion is met. In the problematic region, the outer surface of the digital restoration design is digitally removed and replaced by a new surface. The new surface is generated from a horizontal part 7571 at the restoration margin line, a vertical part 7572 parallel to the inner surface 749, and a kink 7573 connecting the two. The new surface is then combined with the part 758 of the outer surface which already fulfills the minimum thickness criterion.

In a user interface configured for performing the steps of the disclosed method, the user may be provided with options to e.g. define the length of the horizontal part 7571, the length of the kink 7573, and the angle of the kink relative to the horizontal part. If these three parameters are used to adjust the digital restoration design a connecting surface which connects the end of the kink with a point on the digital teeth anatomy can be generated to complete the outer surface of the digital restoration design. The connecting surface preferably provides a smooth transition from the kink to the outer surface of the digital teeth anatomy.

When the problematic region is at the restoration margin line of the digital restoration design the problematic region can instead be digitally removed from the digital restoration design. This adjustment of the digital restoration design typically causes the restoration margin line to be moved upwards, i.e. towards to occlusal table of the digital restoration design. For a restoration where temporary dental restoration configured for being arranged at the patient's unprepared teeth this movement of the restoration margin line is not a problem, since there is no tooth preparation line which it must be aligned with to ensure a proper shape of the digital restoration design and the dental restoration manufactured therefrom. Also when the When the dental restoration has been manufactured from this adjusted digital restoration design there it has a finite thickness at the restoration margin line such that an edge is formed. This may cause irritation when the dental restoration is arranged at the patients teeth. However, the edge and hence the irritation may be significantly reduced by polishing the manufactured restoration.

FIG. 8 illustrates how the digital restoration design can be adjusted to provide for drill compensation.

Figure 8A:
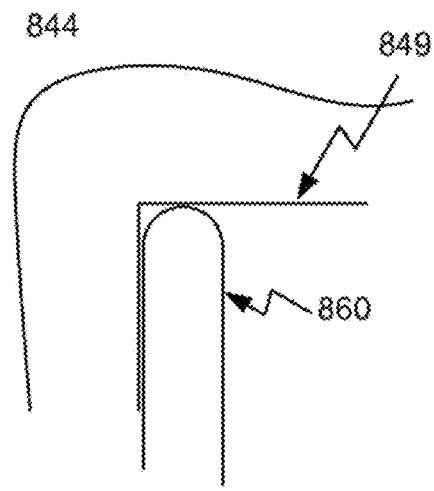
FIGS. 8A through 8D, and 9A through 9C illustrate adjustment of the digital restoration design to provide for drill compensation.
Figure 8B:
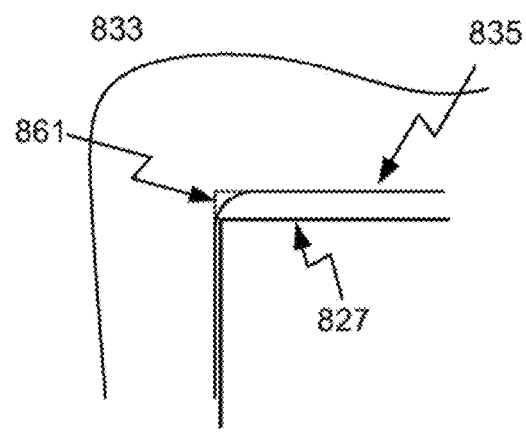

It can be advantageous to apply drill compensation when the digital restoration design is for manufacture of a dental restoration by milling and the digital restoration design has sharp corners which cannot be access by a drill of finite size. The digital restoration design is then adjusted to provide for the drill compensation. FIGS. 8A and 8B illustrate the problem. In FIG. 8A the inner surface 849 of the digital restoration design 844 has a sharp corner. When the dental restoration is defined by drilling away material, e.g. from a zirconia blank, there is a region which cannot be accessed by the drill 860 due to its finite size. In the manufactured dental restoration 833 seen in FIG. 8B there is hence a region of remaining material 861 on the inner surface of the dental restoration 833 caused by the rounded tip of the drill 860. The region of remaining material 861 will collide with the tooth 827 and thus prevent the dental restoration from being arranged correctly at the tooth 827.

Figure 8C:
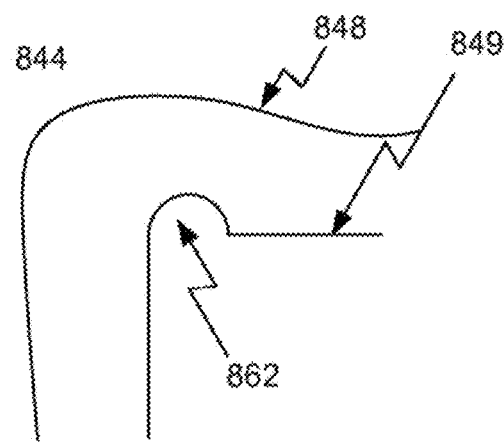
Figure 8D:
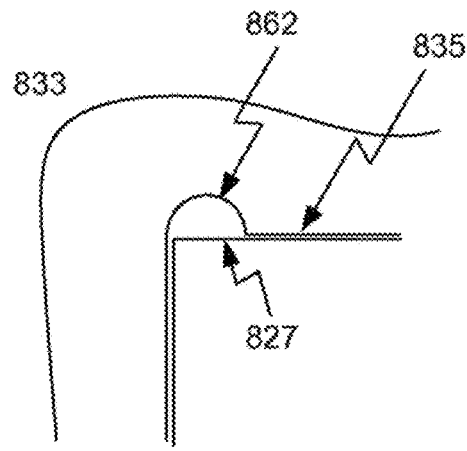

FIG. 8C illustrates drill compensation by introducing an indentation 862 in the inner surface 849 of the digital restoration design 844. Here the diameter of the indentation 862 is chosen to be equal to the diameter of the drill 860 planned to be used in the manufacture of the dental restoration. However it may also be chosen to be e.g. larger than the drill diameter. In FIG. 8C the indentation 862 is shaped as a semi-circle with one edge located at the corner of the inner surface 849 and is oriented such that the indentation can be drilled into the manufactured dental restoration with the drill parallel to the longitudinal axis of the dental restoration. Other shapes of the indentation can also be used such as a rectangular indentation. As seen in FIG. 8D the corresponding indentation 862 in the inner surface of the manufactured dental restoration 833 provides that there is no region of remaining material on the inner surface 835 such that the dental restoration 833 can be arranged correctly at the tooth 827.

FIG. 9 illustrates how the digital restoration design can be adjusted to provide for drill compensation.

Figure 9A:
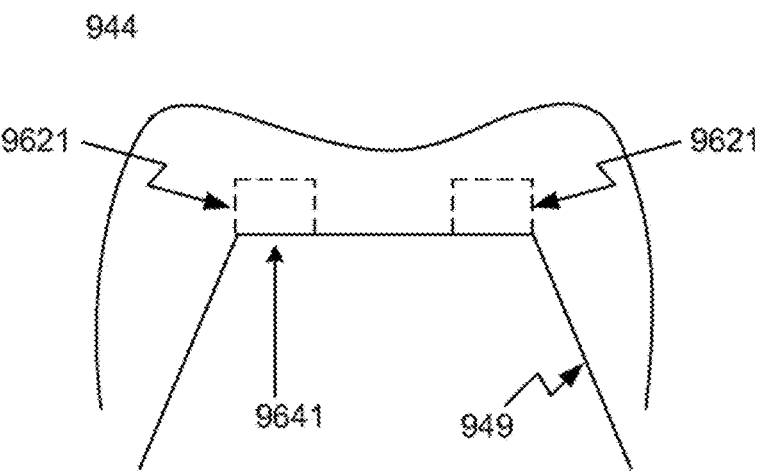

In FIG. 9A a square indentation in the digital restoration design is defined such that the edge of the indentation 9621 is aligned with the corner of the inner surface 949 of the digital restoration design 944. The center axis 9641 of the indentation is indicated as parallel with the longitudinal axis of the dental restoration which in many cases is advantageous during the drilling procedure.

The drill compensation adjustment of the dental restoration design 944 provides that the inner surface of the manufactured dental restoration does not have a region of remaining material which prevents the dental restoration from being arranged at the corresponding tooth/teeth. However, when the indentation is defined the thickness of the digital restoration design 944 and thus of the manufactured dental restoration is reduced at the indentation which in some cases would make the manufactured dental restoration fragile.

Figure 9B:
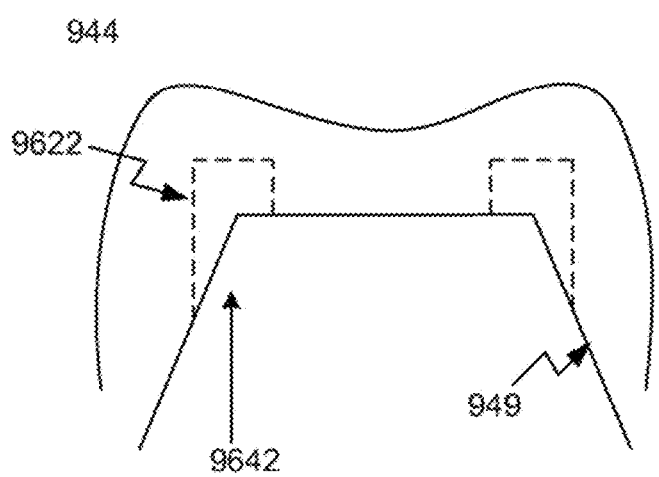

One approach to solve this problem is illustrated in FIG. 9B. Here the indentation 9622 is offset away from the center of the dental restoration design compared to the indentation 9621 seen in FIG. 9A. The center axis of the indentation 9622 is thus offset relative to the center axis 9641 of 9621. This may e.g. be applicable when the dental restoration has an occlusal surface with a depression at the center. The indentation 9622 is then moved towards the thicker part of the dental restoration design 944. In this Figure the center axis 9642 of the indentation 9622 is aligned with the corner of the inner surface 949 of the digital restoration design 944 but other offsets may evidently also provide the same effect.

Figure 9C:
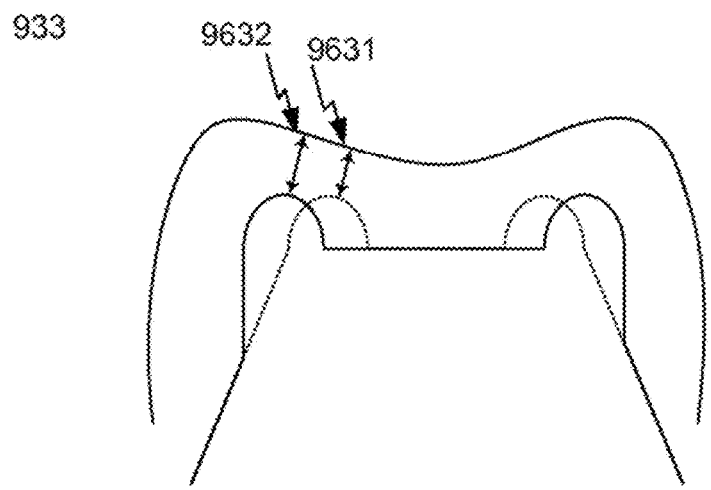

As illustrated in FIG. 9C the offset of the indentation 9622 as described in relation to FIG. 9B compared to the position of the indentation 9621 described in relation to FIG. 9A provides that the manufactured dental restoration is thicker at the indentation as indicated by the arrows 9631 and 9632.

FIG. 10 illustrates curvature matching at the restoration margin line of the dental restoration to provide a smooth transition from teeth to dental restoration at the restoration margin line. The digital restoration design 1044 is seen together with the digital 3D representation 1040 of the corresponding tooth.

Figure 10A:
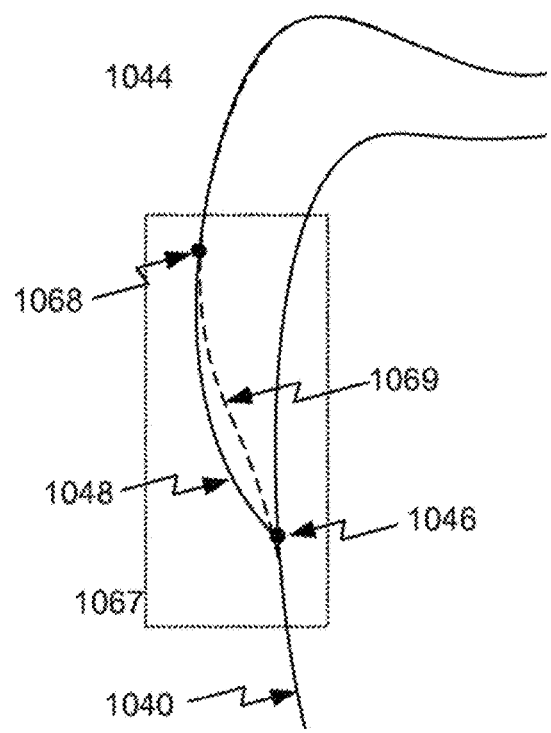
FIGS. 10A through 10C illustrate curvature matching of the digital restoration design at its restoration margin line.

In FIG. 10A a curvature adjustment zone 1067 is indicated at the restoration margin line 1046. Within this zone a measure of the curvatures of the digital restoration design and of the digital 3D representation at the restoration margin line is determined (e.g. the curvature can be expressed as their slope at the restoration margin line) and compared. If the curvatures (i.e. the measures of the curvatures) differs more than a predetermined value, the digital restoration design is adapted to have a similar curvature as the digital 3D representation at the restoration margin line. The curvature adaptation is made smoothly such that the curvature adapted portion 1069 of the outer surface 1048 of the digital restoration design 1044 gradually adapts to match the curvature of the digital 3D representation of the patient's teeth at the restoration margin line 1046.

Outside the boundary 1068 of the curvature adjustment zone 1067 the digital restoration design 1044 is preferably not modified but maintains its shape. The boundary 1068 of the curvature adjustment zone is identified either manually by marking a 3D spline on the digital restoration design 1044 or automatically by computer implemented algorithms configured for defining the transition zone boundary e.g. based on a predefined distance from the restoration margin line or on the contact point between the digital restoration design and the neighboring tooth (natural or restoration).

The curvature matching provides that the transition from dental restoration to tooth/teeth is smooth on a large scale and thus that the dental restoration feels and looks like a natural tooth part of the tooth/teeth.

Figure 10B:
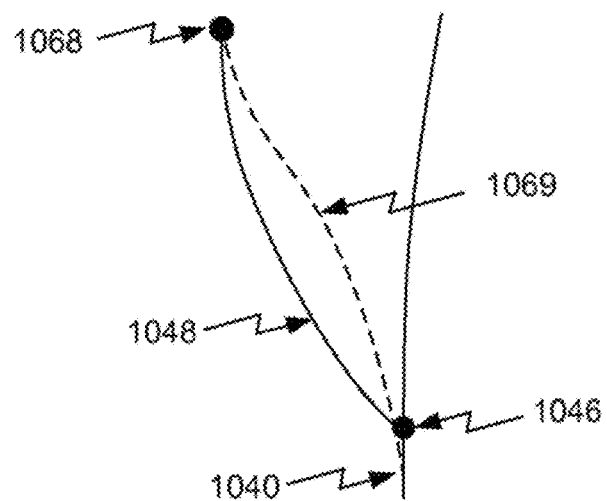

FIG. 10B shows a close-up of the curvature adjustment zone, wherein the result of the curvature matching is seen clearly. Initially the outer surface of the digital restoration design has an angle of approximately 45 degrees to the digital 3D representation 1040. The curvature matched portion of the outer surface is substantially parallel to digital 3D representation at the restoration margin line 1046. Between the restoration margin line and the boundary 1068 of the curvature adjustment zone, the adjusted surface changes smoothly from the curvature of the digital 3D representation at the restoration margin line 1046 to the curvature of the digital restoration design at the boundary 1068 such that an outer surface of the digital restoration design without sharp edges is provided. The curvature adjusted surface can be generated using computer implemented algorithms for generating a new surface from these curvature boundary conditions or by modifying the portion of the outer surface of the digital restoration design in the zone while obeying the curvature boundary conditions.

Figure 10C:
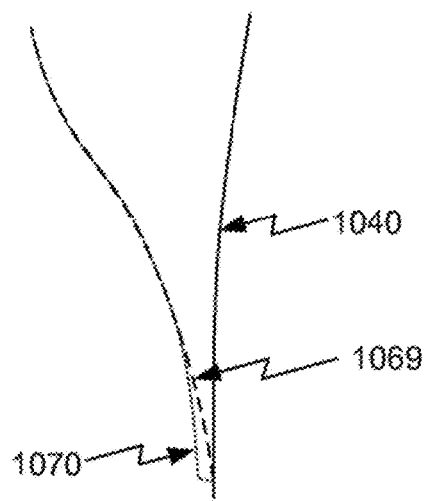

In addition to the curvature matching a minimum thickness control as described above in relation to FIG. 7 can be applied to ensure that the curvature matched portion of the digital restoration design is not too thin. This is illustrated in FIG. 10C. Where the portion 1070 of the outer surface both is curvature matched to the digital restoration design at the restoration margin line and has an increased thickness to provide that the minimum thickness criterion also is fulfilled.

Figure 11:
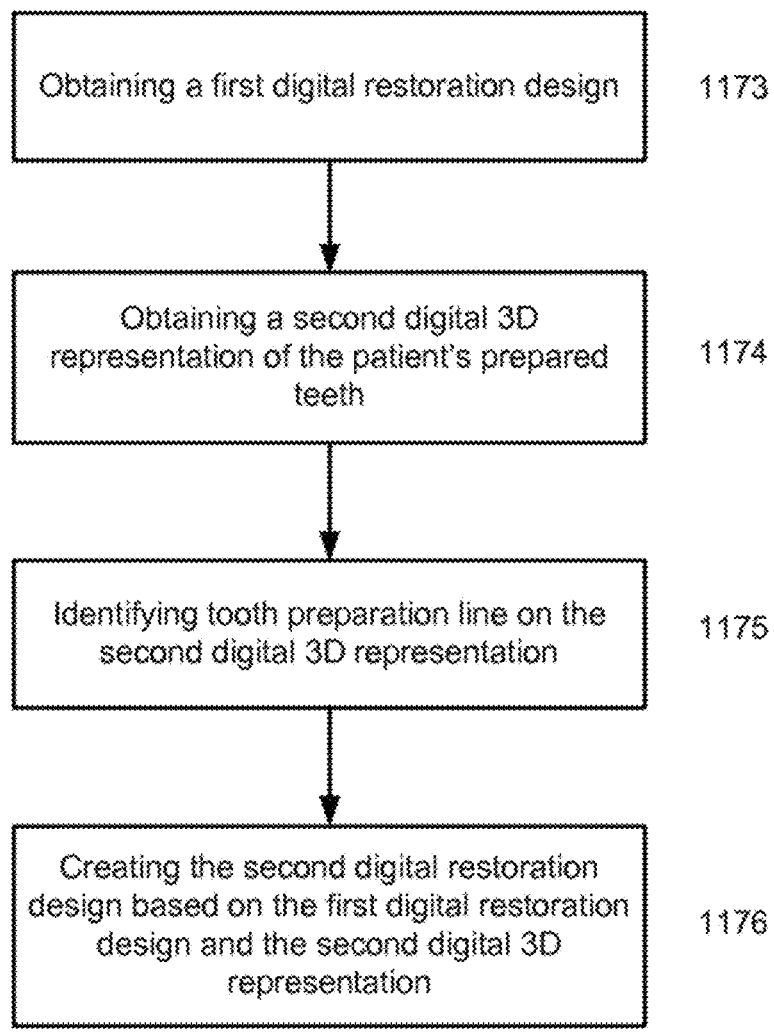
FIG. 11 shows steps of a workflow for creating a second digital restoration design for a permanent table-top restoration.

FIG. 11 shows steps of a workflow for creating a second digital restoration design for a permanent restoration for the patient's teeth when these have been prepared.

When the first digital restoration design created for the unprepared teeth is for the manufacture of a temporary dental restoration (e.g. a table-top set of teeth worn to raise the patient's bite) the first digital restoration design can be used in the creating of a second digital restoration design for a following permanent restoration.

When the dental restoration is a temporary minimum-preparation veneer, it allows the patient to evaluate the appearance of his smile/teeth as determined by the veneer. When the dental restoration is a temporary set of table-top teeth, it helps to raise the patient's bite and get his muscles used to the raised bite. Common for such temporary dental restorations manufactured from a first digital restoration design created using a method disclosed herein is that no removal of tooth material is required to make space for the temporary restoration. In some cases, a minimal preparation of the teeth is made to e.g. enhance the adhesion of the manufactured dental restoration on the unprepared teeth. This may e.g. correspond to removing less than a millimeter of the teeth material. With such a minimum preparation of the teeth, these can still considered as unprepared teeth. Substantive preparation of the teeth can hence be postponed e.g. to after the patient has had a chance to evaluate the smile or the effect on the bite raise. A second digital restoration design for the manufacture of the permanent restoration can then be created based on a second digital 3D representation of the teeth obtained after these have been prepared for accepting the permanent restoration.

In step 1173, the first digital restoration design used for the manufacture of the temporary restoration is obtained. The first digital restoration design can be obtained using any of the embodiments described herein, one embodiment comprising the steps of obtaining a first digital 3D representation of the patient's unprepared teeth, obtaining a set of one or more digital teeth anatomies, and creating the first digital restoration design e.g. based on coronal portions of the first digital 3D representation and of the digital teeth anatomies. The first digital restoration design can e.g. be created using a Boolean subtraction as described above in relation to FIG. 6 or any other technique suitable for creating the first digital restoration design.

In step 1174 a second digital 3D representation of the patient's prepared teeth is obtained. Prior to obtaining the second digital 3D representation, a dentist has prepared the teeth by removing tooth material to make space for the permanent dental restoration.

Both the first and second digital 3D representations can be obtained by intra oral scanning using e.g. a TRIOS intra-oral scanner or any of the other techniques know to the skilled person, such as scanning an impression of the patient's teeth or a physical model manufactured from such an impression.

The workflow of FIG. 11 can be initiated when the first and second digital 3D representations are obtained. All dental work on the patients teeth have then been completed when the workflow is initiated.

In step 1175 a tooth preparation line on the second digital 3D representation is identified. The tooth preparation line marks the part of a prepared tooth which will be aligned with the restoration margin line of the permanent dental restoration when this is seated at the prepared tooth. The tooth preparation line can e.g. be identified automatically be computer implemented algorithms configured for analyzing the second digital 3D representation of the prepared teeth. The identification can be based on a geometry and/or texture analysis of the second digital 3D representation depending on the character of the second digital 3D representation.

In step 1176 the second digital restoration design is created based on the first digital restoration design and the second digital 3D representation. The creating comprises executing a computer implemented algorithms configured for generating a connecting surface which connects the tooth preparation line and the outer surface of the first digital restoration design. The line where the connecting surface connects to the first digital restoration design may be determined by the operator or automatically. The connecting surface can connect to the first digital restoration design at its restoration margin line or coronally to this which in many cases gives a smoother outer surface for the second digital restoration design. The inner surface of the second digital restoration design is created based on the part of the second digital 3D representation corresponding to the prepared tooth, i.e. the part onto which the manufactured permanent restoration is to be seated. Thereby the permanent dental restoration can be seated at the prepared teeth and has an outer surface with e.g. an occlusal table according to that of the temporary table-top teeth. Preferably the inner surface is offset from the surface of the second digital 3D representation to provide space for the cement used to attach the manufactured dental restoration to the prepared tooth.

In addition to or instead of using the first digital restoration design the digital teeth anatomies can be used when creating the second digital restoration design. The digital teeth anatomies are then arranged relative to the second digital 3D representation and the connecting surface connects the tooth preparation line and the outer surface of the digital teeth anatomies.

FIG. 12 shows a schematic of how the second digital restoration design for manufacture of a permanent dental restoration for the patient's prepared teeth can be created. In this Example the dental restoration is a table-top restoration but the method is equally applicable to other dental restorations, such as minimum-preparation veneers.

Figure 12A:
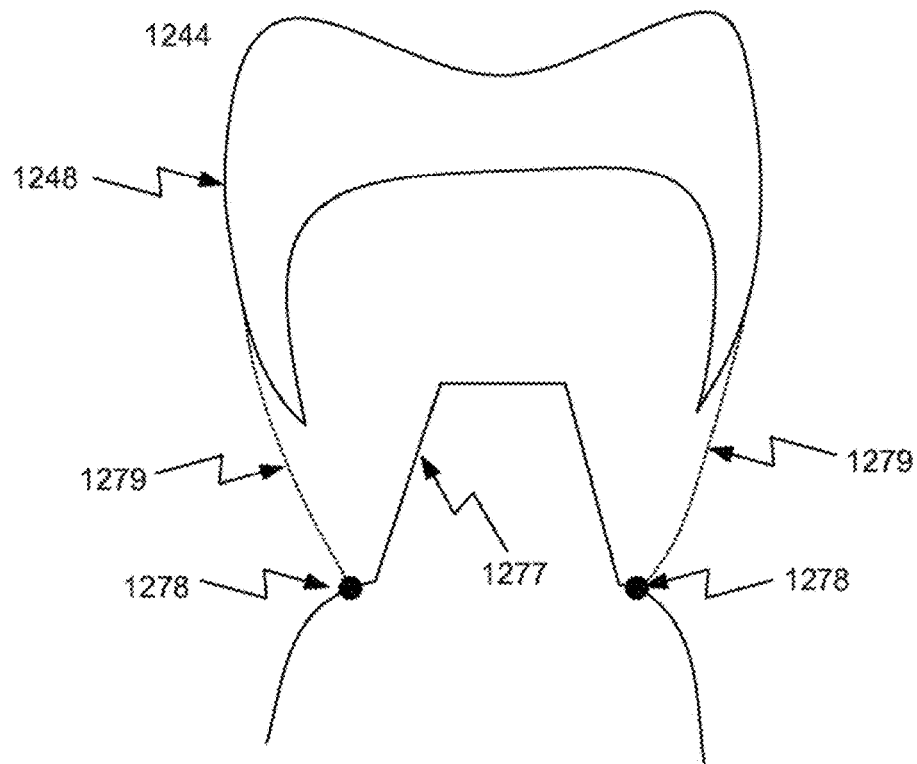
FIGS. 12A and 12B show schematics of a second digital restoration design for a permanent dental restoration.

In FIG. 12A the digital restoration design for the temporary dental restoration (also referred to as the first digital restoration design) and the second digital 3D representation 1277 of the prepared teeth are arranged relative to each other according to the arrangement of the first digital restoration design relative to the patient's unprepared teeth.

If some of the neighboring teeth are not prepared such that their surfaces are identical in the first and second digital 3D representations, these surfaces can be used for arranging the second digital 3D representation relative to the first digital 3D representation. Based on the knowledge of the relative arrangement of the first digital restoration design and the first digital 3D representation, the correct relative arrangement of the first digital restoration design and the second digital 3D representation can be deduced. The arrangement can also be based on soft tissue, such as the palette structure in the upper jaw. An articulator can also be used for determining the correct relative arrangement of the first digital restoration design and the second digital 3D representation. The arranging can take the form of determining transformation matrices for mapping the different units into a common coordinate system, such as transformation matrices for mapping the second digital 3D representation and the first digital restoration design into the coordinate system of the first digital 3D representation.

The tooth preparation line 1278 of the second digital 3D representation 1277 is identified e.g. be feature detection and/or by an operator indicating the position of the tooth preparation line on a visualization of the second digital 3D representation 1277 provided e.g. on a computer screen.

The generated connecting surface 1279 extends between the tooth preparation line 1278 and the outer surface 1248 of the first digital restoration design 1244. The part of the outer surface 1248 above the point where the connecting surface contacts the first digital restoration design forms the coronal part of the outer surface of the second digital restoration design, while the connecting surface 1279 forms a cervical part of the outer surface of the second digital restoration design.

Figure 12B:
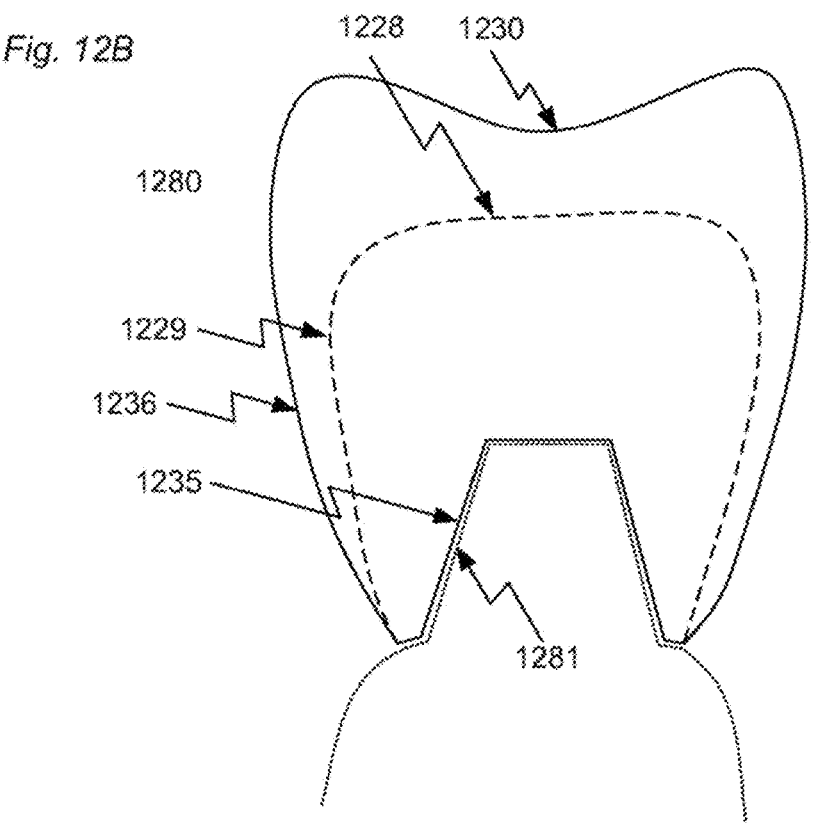

FIG. 12B shows a schematic cross section of the dental restoration 1280 manufactured from the second digital restoration design of FIG. 12A. The inner surface 1235 is shaped to allow the permanent dental restoration to be seated at the prepared tooth 1281 and the outer surface 1236 is such that the occlusal table 1230 with the restoration is raised compared to the occlusal table 1228 of the teeth in their (unprepared) shape 1229 prior to the raise of the bite.

Figure 13:
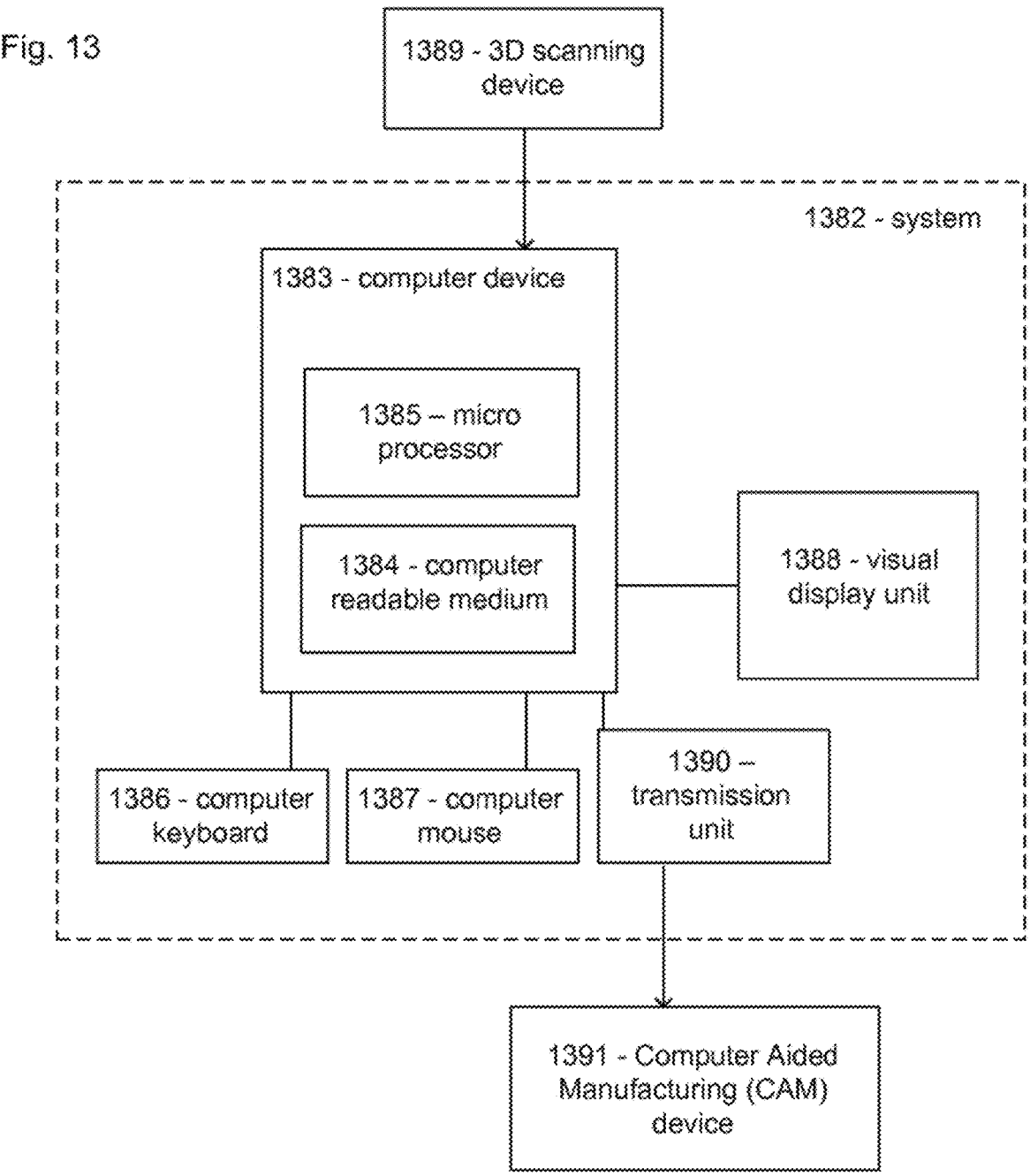
FIG. 13 shows a schematic of a system.

FIG. 13 shows a schematic of a system according to an embodiment of the invention. The system 1382 comprises a computer device 1383 comprising a computer readable medium 1384 and a data processor in the form of a microprocessor 1385. The system further comprises a visual display unit 1388, a computer keyboard 1386 and a computer mouse 1387 for entering data and activating virtual buttons of a user interface visualized on the visual display unit 1388. The visual display unit 1388 can e.g. be a computer screen.

The computer device 1383 is capable of obtaining at least a digital 3D representation of a part of the patient's teeth for which a dental restoration is to be designed and manufactured, and at least one digital teeth anatomy which will be used for determining the shape of the outer surface of the dental restoration. The obtained digital 3D representation and digital teeth anatomies can be stored in the computer readable medium 1384 and provided to the processor 1385. The system 1382 is configured for allowing an operator to arrange the digital 3D representation and digital teeth anatomies relative to each other in a manner that reflects the preferred arrangement of the outer surface of the manufactured dental restoration relative to the patient's teeth. For a table-top restoration the preferred arrangement is that which provides the desired raise of the patient's bite, i.e. where the dental restoration raises the occlusal table of the teeth. This can be realized by displaying the digital 3D representation and digital teeth anatomies in a user interface depicted on the visual display unit 1388 and the operator can adjust their relative arrangement using e.g. the computer mouse 1387 or the computer keyboard 1386. The computer device 1383 can be configured for executing algorithms for creating the digital restoration design e.g. based on coronal portions of the digital 3D representation and of the digital teeth anatomies. The algorithms can be based e.g. on a Boolean subtraction of solid digital structures as described above in relation to FIGS. 1 and 6.

The computer device 1383 is further capable of receiving a digital 3D representation of the patient's teeth from a 3D scanning device 1389, such as the TRIOS intra-oral scanner manufactured by 3shape TRIOS A/S, or capable of receiving scan data from such a 3D scanning device and forming a digital 3D representation of the patient's teeth based on such scan data. The received or formed digital 3D representation can be stored in the computer readable medium 1384 and provided to the microprocessor 1385.

When performing different steps of a method according to the invention, such as when arranging the digital 3D representation of the teeth and the digital teeth anatomies in relation to each other, one or more options can be presented to the operator, such as which digital teeth anatomies to select or whether he wishes to create the digital restoration design by a Boolean subtraction. The options can be presented in a user interface visualized on the visual display unit 1388.

The system can have a unit 1390 for transmitting the created a digital restoration design to e.g. a computer aided manufacturing (CAM) device for manufacturing the dental restoration or to another computer system e.g. located at a milling center where the dental restorations are manufactured. The unit for transmitting can be a wired or a wireless connection.

The 3D scanning of the patient's teeth using the 3D scanning device 1389 can be performed at a dentist office while the creating of the digital restoration design is performed at a dental laboratory. In such cases the digital 3D representation of the patient's teeth can be provided to the dental laboratory e.g. via an internet connection.

Figure 14:
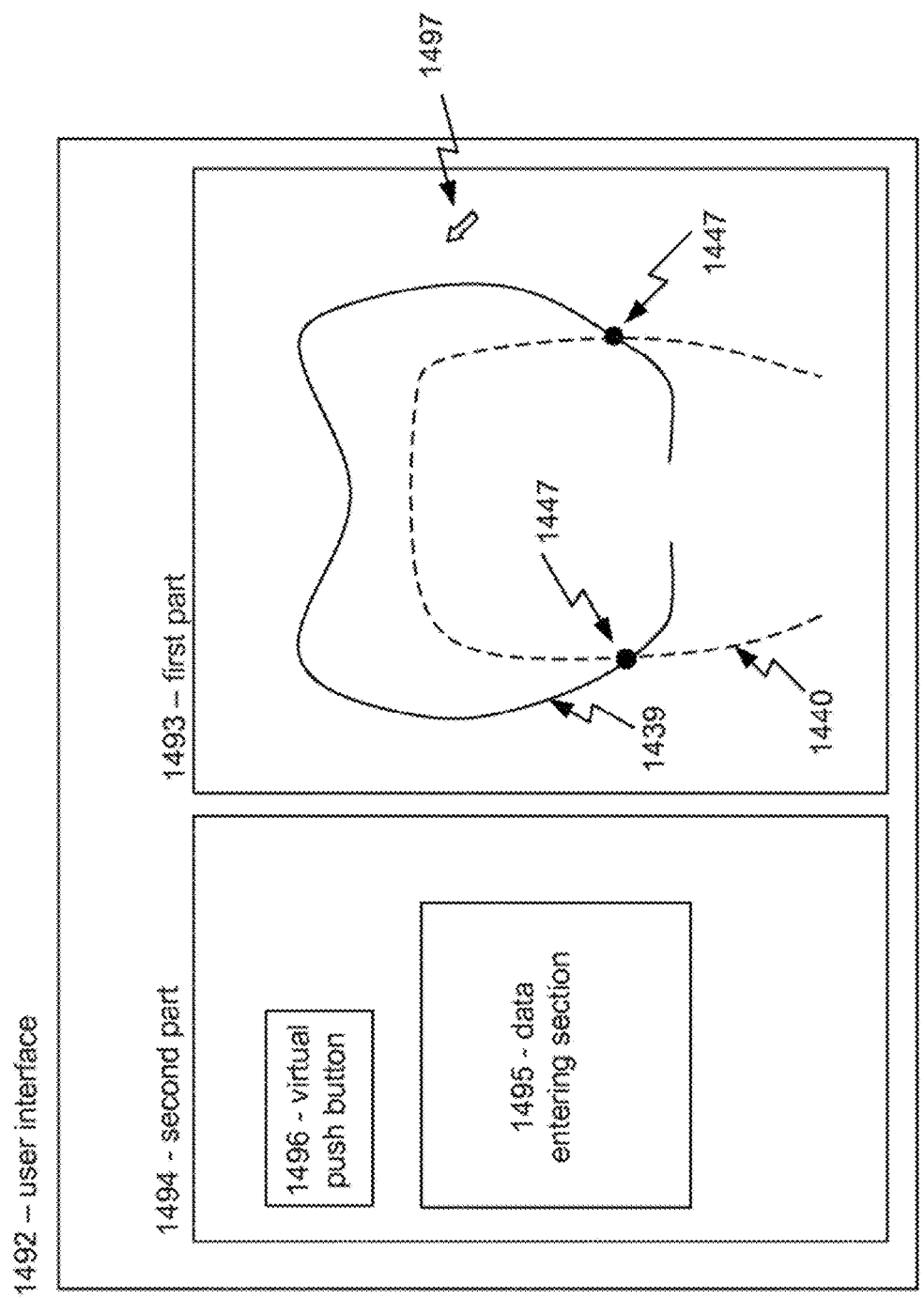
FIG. 14 shows a schematic of a user interface.

FIG. 14 shows a schematic of a user interface according to an embodiment of the invention.

In FIG. 14 a first part 1493 of the user interface 1492 is seen in which a part of the digital 3D representation 1440 and a digital tooth anatomy 1439 are illustrated. The relative arrangement of the digital 3D representation and the digital tooth anatomy can be adjusted using a digital movement tool 1497. The virtual movement tool can be configured for grabbing e.g. the digital tooth anatomy 1439 and moving it in the user interface using e.g. a computer mouse. Computer implemented algorithms can then translate the change in the relative arrangement into a change in the intersection 1442 of the two digital surfaces 1439, 1440.

The second part 1494 of the user interface comprises a data entering section for entering data relating to e.g. whether the digital restoration design is to be created using Boolean subtraction and/or whether a minimum thickness correction is to be applied to the created digital restoration design. A virtual push button 1496 is configured for creating the digital restoration design taking into account the data entered in the data entering section 1495.

The user interface can be visualized on a visual display unit, such as a computer screen being part of a system configured for implementing the method according to the present invention.

Figure 15:
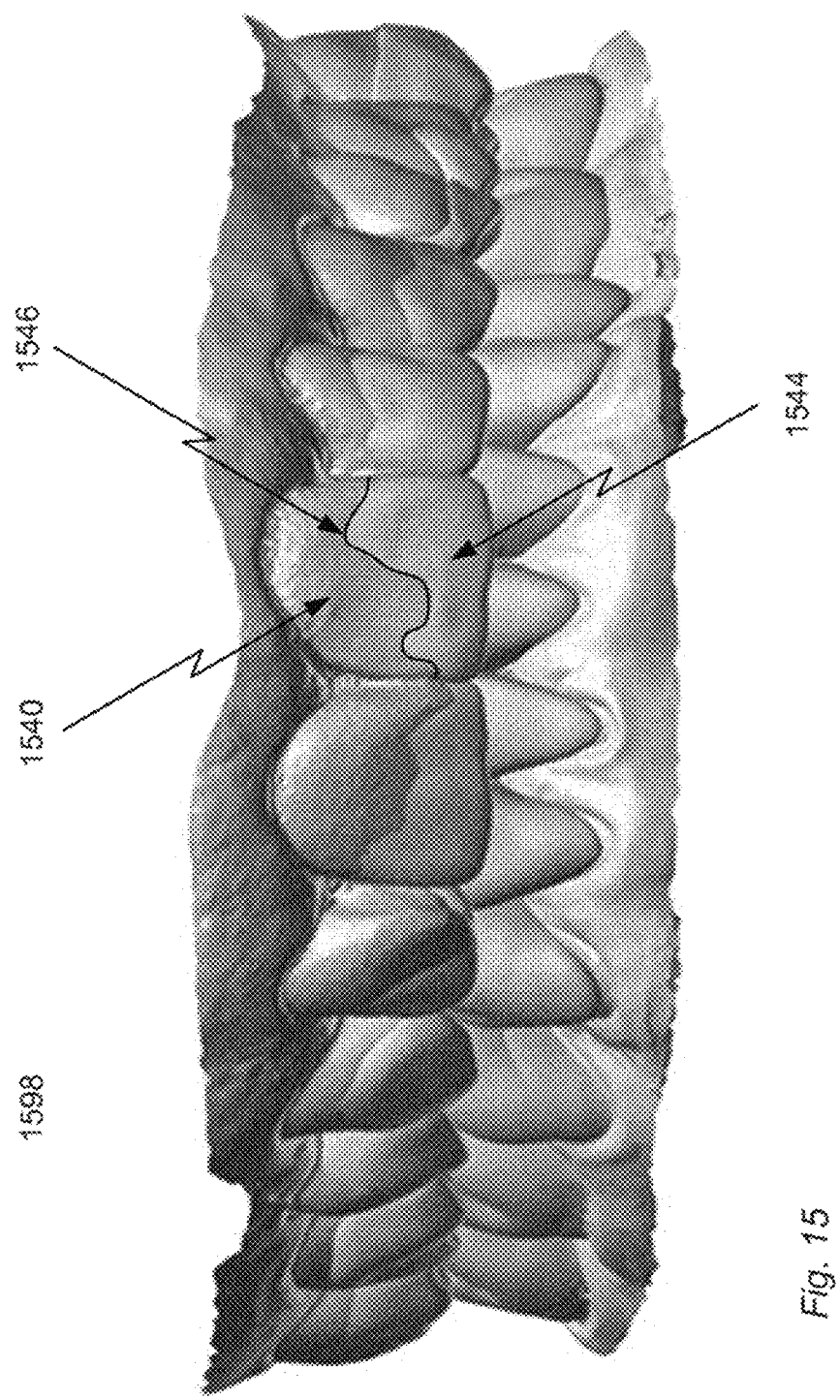
FIG. 15 shows part of a screen shot of a user interface.

FIG. 15 shows part of a screen shot 1598 from a user interface visualizing a created digital restoration design for a table-top restoration. The table-top restoration is configured for being arranged on top of the patient's existing teeth where it provides that the occlusal table of the teeth is raised, i.e. the teeth/restoration ensemble has an occlusal table which is raised compared to the occlusal table of the teeth.

The digital restoration design 1544 of the table-top restoration is visualized on top of the digital 3D representation 1540 of the teeth in the patient's upper jaw for which it has been designed. In this figure the restoration margin line 1546 is emphasized for the central left anterior tooth to emphasize its location.

Figure 16:
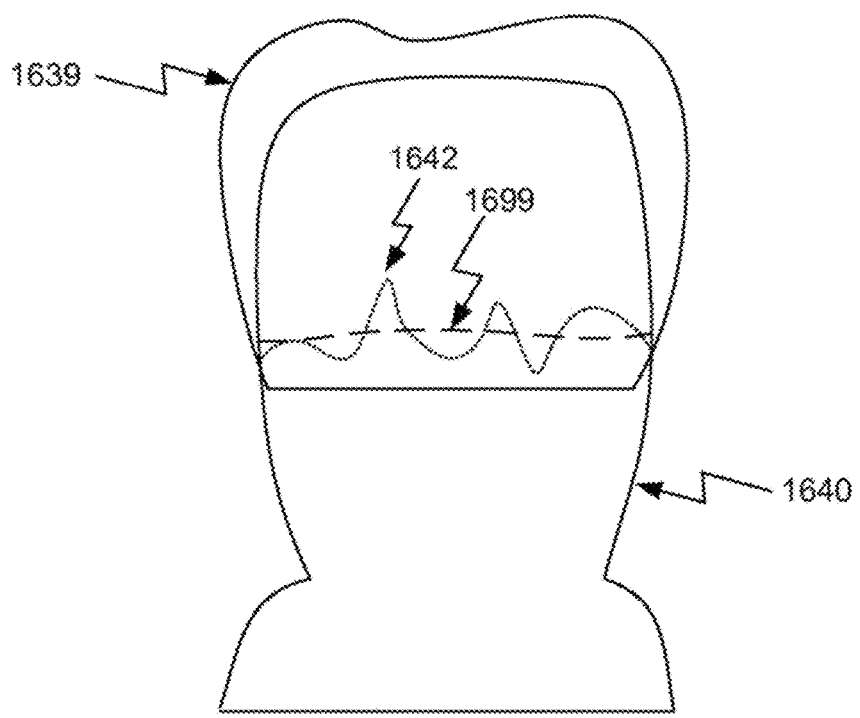
FIG. 16 shows a smooth curve formed based on the intersection.

FIG. 16 shows a smooth curve defined from a jagged intersection

The intersection between the digital teeth anatomy 1639 for a table top restoration is arranged relative to the digital 3D representation of the patient's unprepared tooth 1640. The intersection 1642 is highly jagged such that it will be difficult to manufacture the dental restoration from a digital restoration design with a restoration margin defined by directly copying the intersection. Instead a smooth curve 1699 is defined on the digital 3D representation. The curve can either be defined by use of a computer algorithm calculating a curve with suppressed fluctuations or by an operator using e.g. a computer mouse to draw the curve on a visualization of the digital 3D representation and the digital teeth anatomy.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

SELECTED FIGURE REFERENCE NUMBERS

In the Figures the reference numbers are provided in the format according to XYY where "X" is a Figure number indicator showing in which Figure the reference is used and YY is the item number indicator according to the following list.
Patient's teeth 20
Tooth intersected by cross sectional line 21
Cross section of tooth 25
Unprepared teeth 27
Occlusal table of unprepared teeth 28
Original shape of the teeth 29
Original occlusal table of teeth 30
Teeth/restoration ensemble 32
Table-top restoration 33
Inner surface of restoration 35
Outer surface of restoration 36
Digital tooth anatomy/digital teeth anatomies 39
Digital 3D representation 40
Intersection 42
Digital restoration design 44
Restoration margin line 46
Outer surface of digital restoration design 48
Inner surface of digital restoration design 49
Frame 53
Problematic region 55
New surface in problematic region 57
Horizontal part of new surface 571
Vertical part of new surface 572
Kink on new surface 573
Part of outer surface fulfilling minimum thickness criterion 58
Drill 60
Remaining material blocking restoration from being correctly inserted 61
Indentation 62
A first indentation 621
An offset indentation 622
Restoration thickness at indentation 63
Center axis of first indentation 641
Center axis of offset indentation 642
Curvature adjustment zone 67
Boundary for curvature adjusted portion 68
Curvature adjusted portion 69
Curvature and minimum thickness adjusted portion 70
Workflow for creating digital restoration design for permanent restoration 72
Second digital 3D representation 77
Tooth preparation line 78
Connecting surface 79
Second digital restoration design 80
Prepared tooth 81
System 82
Computer device 83
Computer readable medium 84
Hardware data processor/Microprocessor 85
Computer keyboard 86
Computer mouse 87
Visual display unit 88
3D scanning device 89
Transmission unit 90
Computer aided manufacturing (CAM) device 91
User interface 92
First part of user interface 93
Second part of user interface 94
Data entering section 95
Virtual push button 96
Digital movement tool 97
Screen shot 98
Smooth curve 99

The invention claimed is:

1. A method for creating a digital restoration design comprising a restoration margin line for the manufacture of a table-top restoration for one or more of a patient's teeth, wherein the method comprises:
obtaining a digital 3D representation of the one or more of the patient's teeth, when the one or more of the patient's teeth are unprepared, in a coordinate system;
downloading a set of one or more digital 3D teeth anatomies expressing a desired target shape of the table-top restoration;
mapping the set of the one or more digital 3D teeth anatomies into a common coordinate system with the digital 3D representation of the one or more of the patient's unprepared teeth, or vice versa;
arranging the set of the one or more digital 3D teeth anatomies and the digital 3D representation of the one or more of the patient's unprepared teeth according to a preferred relative arrangement in the common coordinate system;
defining a restoration margin line at least partly by identifying a plurality of locations where an outer surface of the digital 3D representation of the one or more of the patient's unprepared teeth intersects with a surface of the set of the one or more digital teeth anatomies after the digital 3D teeth anatomies and the digital 3D representation of the one or more of the patient's unprepared teeth are arranged according to the preferred relative arrangement; and
creating, by modifying the downloaded set of the one or more digital 3D teeth anatomies, the digital restoration design.

2. The method according to claim 1, where an outer surface of the digital restoration design is formed at least partly based on portions of the set of the one or more digital 3D teeth anatomies located coronal to the restoration margin line.

3. The method according to claim 1, wherein the restoration margin line is shaped according to a curve defined on the digital 3D representation of the one or more of the patient's unprepared teeth by smoothing the intersection.

4. The method according to claim 3, wherein the portion of the digital teeth anatomies based on which the outer surface of the digital restoration design is bounded by the defined curve.

5. The method according to claim 1, wherein creating the digital restoration design comprises a Boolean subtraction of the digital 3D representation of the one or more of the patient's unprepared teeth from the set of the one or more digital 3D teeth anatomies.

6. The method according to claim 1, where an inner surface of the digital restoration design is created based on a portion of the digital 3D representation of the teeth coronal to the restoration margin line.

7. The method according to claim 6, wherein an inner surface of the digital dental design is created by copying a portion of the digital 3D representation of the one or more of the patient's unprepared teeth coronal to the restoration margin line.

8. The method according to claim 7, wherein an offset is applied to the copied surface in order to make space for cement used for attaching the table-top restoration to the teeth.

9. The method according to claim 1, wherein the method comprises examining the digital restoration design with respect to one or more minimum thickness criteria to identify any problematic regions.

10. The method according to claim 9, wherein the method comprises adjusting the digital restoration design in the problematic regions.

11. The method according to claim 10, wherein the adjusting comprises:
increasing a thickness of the digital restoration design in the problematic regions such that minimum thickness criteria are met, and/or
digitally removing the problematic regions from the digital restoration design.

12. The method according to claim 1, wherein the digital restoration design is for manufacture of the table-top restoration by milling and the method comprises adjusting the digital restoration design to provide for drill compensation, wherein the drill compensation is provided by introducing one or more indentations on an inner surface of the digital restoration design.

13. The method according to claim 1, wherein the method comprises adjusting a curvature of the digital restoration design at the restoration margin line to match a curvature of the digital 3D representation of the one or more of the patient's unprepared teeth.

14. The method according to claim 1, wherein the method comprises smoothing the restoration margin line.

15. The method according to claim 1, wherein the table-top restoration is a restoration of a patient's occlusal table.

16. The method according to claim 1, wherein the set of one or more digital 3D teeth anatomies expressing a desired target shape of the table-top restoration is downloaded from a library.

17. The method according to claim 1, wherein the mapping comprises determining a transformation matrix for bringing the digital 3D representation of the one or more of the unprepared patient's teeth and the set of one or more digital 3D teeth anatomies in the common coordinate system.

18. The method according to claim 1, wherein an effective shape of the teeth with the dental restoration mounted thereon is determined in part from a shape of the set of one or more digital 3D teeth anatomies and in part from the preferred relative arrangement of the set of one or more digital 3D teeth anatomies and the digital 3D representation.

19. The method according to claim 1, further comprising digitally removing portions of the set of one or more digital 3D teeth anatomies cervical/apical to the restoration margin line and using the thus truncated digital teeth anatomies in creating the digital dental design.

20. The method according to claim 1, further comprising digitally removing portions of the digital 3D representation cervical to the restoration margin line and using the thus truncated digital 3D representation when creating the digital dental design.

21. The method according to claim 1, further comprising adjusting a curvature of the digital restoration design to that of a curvature of the digital 3D representation at the restoration margin line.

22. A method for creating a digital restoration design comprising a restoration margin line for the manufacture of a minimum-preparation veneer for one or more of a patient's teeth, wherein the method comprises:
obtaining a digital 3D representation of the one or more of the patient's teeth, when the one or more of the patient's teeth are unprepared;
downloading a set of one or more digital 3D teeth anatomies expressing a desired target shape of the dental restoration;
mapping the set of the one or more digital 3D teeth anatomies into a common coordinate system with the digital 3D representation of the one or more of the patient's unprepared teeth, or vice versa;
arranging the set of the one or more digital 3D teeth anatomies and the digital 3D representation of the one or more of the patient's unprepared teeth according to a preferred relative arrangement in the common coordinate system in which the manufactured minimum-preparation veneer improves the aesthetic appearance of the patient's teeth;
defining a restoration margin line at least partly by identifying a plurality of locations where an outer surface of the digital 3D representation of the one or more of the patient's unprepared teeth intersects with a surface of the set of the one or more digital teeth anatomies after the set of one or more digital 3D teeth anatomies and the digital 3D representation of the one or more of the patient's unprepared teeth are arranged according to the preferred relative arrangement; and
creating, by modifying the downloaded set of one or more digital 3D teeth anatomies, the digital restoration design.

23. A method for creating a table-top restoration for one or more of a patient's teeth, wherein the method comprises:
acquiring a digital design for a table-top restoration, wherein the digital design is created by:
obtaining a digital 3D representation of the one or more of the patient's teeth, when the one or more of the patient's teeth are unprepared;
downloading a set of one or more digital 3D teeth anatomies expressing a desired target shape of the table-top restoration;
mapping the set of the one or more digital 3D teeth anatomies into a common coordinate system with the digital 3D representation of the one or more of the patient's unprepared teeth, or vice versa;
arranging the set of the one or more digital 3D teeth anatomies and the digital 3D representation of the one or more of the patient's unprepared teeth according to a preferred relative arrangement in the common coordinate system;
defining a restoration margin line at least partly by identifying a plurality of locations where an outer surface of the digital 3D representation of the one or more of the patient's unprepared teeth intersects with a surface of the set of the one or more digital teeth anatomies after the digital 3D teeth anatomies and the digital 3D representation of the one or more of the patient's unprepared teeth are arranged according to the preferred relative arrangement;
creating, by modifying the downloaded set of one or more digital 3D teeth anatomies, the digital restoration design; and
manufacturing the table-top restoration using the acquired digital design for the table-top restoration.

* * * * *